United States Patent
Kokubo et al.

(10) Patent No.: US 11,040,482 B2
(45) Date of Patent: Jun. 22, 2021

(54) TRANSFER METHOD, TRANSFER APPARATUS, AND MOLD

(71) Applicant: Toshiba Kikai Kabushiki Kaisha, Tokyo (JP)

(72) Inventors: Mitsunori Kokubo, Numazu (JP); Yuki Sugiura, Mishima (JP); Shigeru Fujiwara, Numazu (JP); Yuki Hashimoto, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 347 days.

(21) Appl. No.: 15/902,095

(22) Filed: Feb. 22, 2018

(65) Prior Publication Data

US 2018/0243971 A1 Aug. 30, 2018

(51) Int. Cl.

| B29C 59/04 | (2006.01) |
|---|---|
| B29C 59/02 | (2006.01) |
| B29C 35/08 | (2006.01) |
| B29C 59/00 | (2006.01) |
| B29C 37/00 | (2006.01) |

(52) U.S. Cl.
CPC ........ *B29C 59/046* (2013.01); *B29C 35/0805* (2013.01); *B29C 35/0894* (2013.01); *B29C 37/0003* (2013.01); *B29C 59/002* (2013.01); *B29C 59/021* (2013.01); *B29C 59/026* (2013.01); *B29C 2035/0827* (2013.01)

(58) Field of Classification Search
None
See application file for complete search history.

(56) References Cited

U.S. PATENT DOCUMENTS

| 8,828,307 | B2* | 9/2014 | Okushima | ........... B29C 35/0888 |
|---|---|---|---|---|
| | | | | 264/488 |
| 9,880,463 | B2* | 1/2018 | Wakabayashi | ........ G03F 7/0002 |
| 10,067,420 | B2* | 9/2018 | Arai | ..................... G03F 7/0002 |
| 2007/0099323 | A1 | 5/2007 | Chang et al. | |

(Continued)

FOREIGN PATENT DOCUMENTS

| JP | 2005-354017 | 12/2005 |
|---|---|---|
| JP | 2007-128083 | 5/2007 |
| JP | 2008044289 A * | 2/2008 |

(Continued)

OTHER PUBLICATIONS

Machine English Translation of JP-2008044289-A Specification, Retrieved Apr. 2, 2020 (Year: 2008).*

(Continued)

*Primary Examiner* — Peter L Vajda
*Assistant Examiner* — Adrianna N Konves
(74) *Attorney, Agent, or Firm* — DLA Piper LLP US

(57) ABSTRACT

According to one embodiment, under a condition that a substrate is installed on a substrate installation unit, a mold is installed on a mold installation unit, and a mask unit is installed in a mask-unit installation unit, a transfer apparatus controls an operation of a mold presser unit so as to press the mold against the substrate, the operation of a first positioning unit so as to position the mask unit with respect to the mold and the operation of an irradiation unit so as to irradiate an uncured material provided on the surface of the substrate with electromagnetic waves of a predetermined wavelength.

5 Claims, 20 Drawing Sheets

(56) References Cited

U.S. PATENT DOCUMENTS

2010/0173113 A1\* 7/2010 Ermochkine ........ B29C 59/026
  428/58
2010/0189839 A1 7/2010 Sano et al.

FOREIGN PATENT DOCUMENTS

| JP | 2013/038117 | 2/2013 |
| JP | 2014-040070 | 3/2014 |
| KR | 10-2010-0050508 | 5/2010 |
| KR | 10-1171190 | 8/2012 |

OTHER PUBLICATIONS

Korean Office Action in KR Application No. 10-2018-0021781 dated Aug. 27, 2019.
Office Action in KR Application No. 10-2018-0021781 dated Jan. 30, 2019.
Japanese Office Action in JP Application No. 2017-037017 dated Nov. 4, 2020.

\* cited by examiner

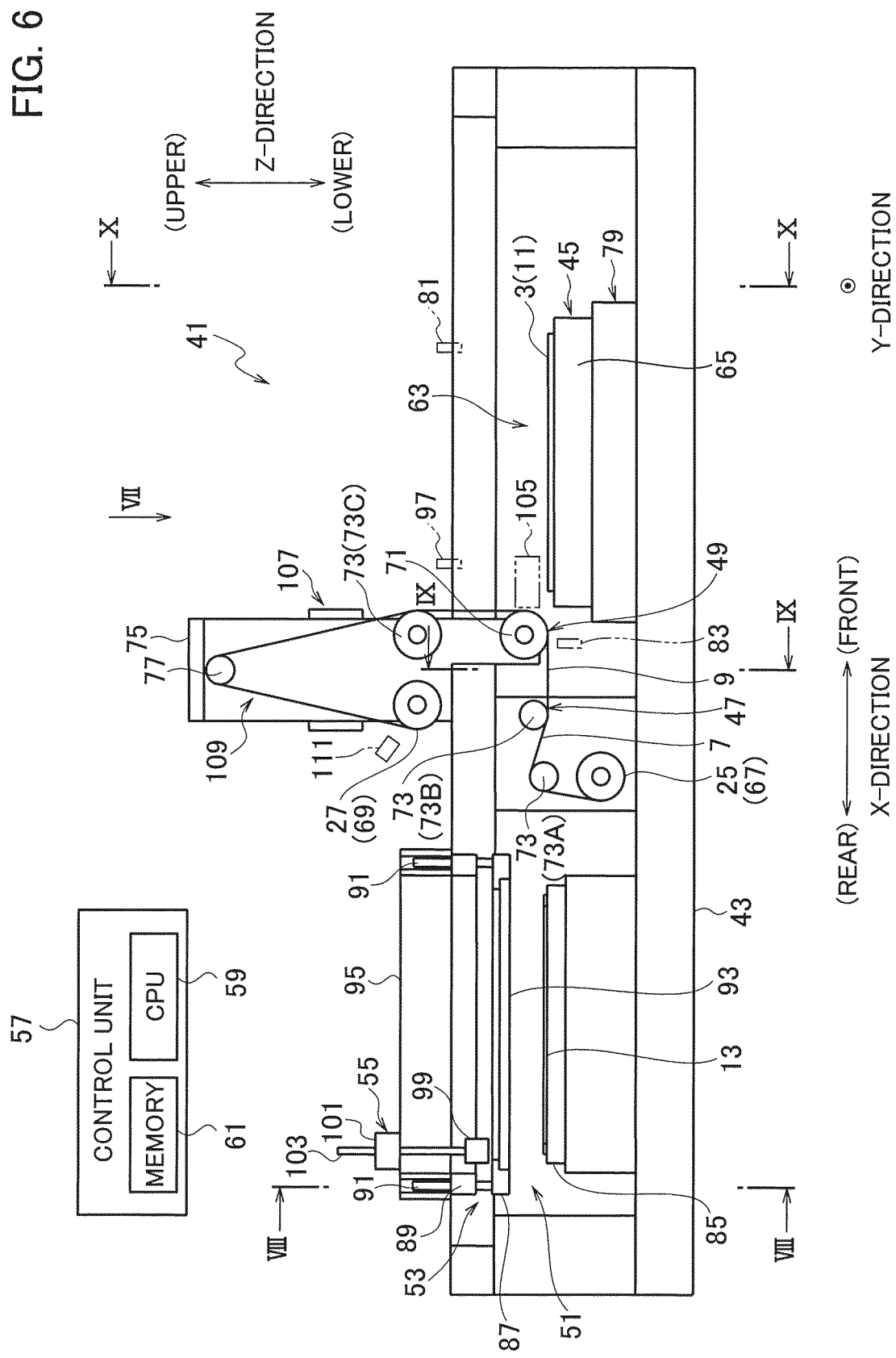

TRANSFER METHOD, TRANSFER APPARATUS, AND MOLD

CROSS REFERENCE TO RELATED APPLICATION

This application is based upon and claims the benefit of priority from Japanese Patent Applications No. 2017-036967 and No. 2017-037017, each filed Feb. 28, 2017; the entire contents of all of which are incorporated herein by reference.

FIELD

Embodiments described herein relate generally to a transfer method, a transfer apparatus, and a mold, and in particular, to a method and an apparatus for transferring with use of a mask unit.

BACKGROUND

As a transfer apparatus of a conventional example, there is known a transfer apparatus that is configured to: move a roller around which a long-sheet like mold having a predetermined transfer pattern formed thereon is wound; press the mold against a substrate on which ultraviolet curable resin is provided; and irradiate ultraviolet ray to cure the ultraviolet curable resin, thereby transferring the transfer pattern of the mold onto the ultraviolet curable resin.

BRIEF DESCRIPTION OF THE DRAWINGS

FIG. 6 is a diagram illustrating a schematic configuration of a transfer apparatus according to the embodiment.

DETAILED DESCRIPTION

According to one embodiment, a transfer method includes: installing a substrate on a substrate installation unit, the substrate having a surface provided with a material that is cured by irradiation with electromagnetic waves of a predetermined wavelength; pressing a mold having a predetermined transfer pattern formed thereon against the substrate installed on the substrate installation unit; positioning a mask unit with respect to the mold, the mask unit being formed with an electromagnetic-wave transmitting part of a predetermined shape through which the electromagnetic waves are transmitted; and irradiating the material set on the substrate with the electromagnetic waves through the electromagnetic-wave transmitting part of the mask unit on condition of positioning the mask unit with respect to the mold.

Various embodiments will be described hereinafter with reference to the accompanying drawings.

A product (or semi-finished product) 1 manufactured by a transfer method according to an embodiment will be described with reference to FIGS. 1 and 2. For convenience of explanation, it is assumed that one predetermined horizontal direction is an X-direction (front and rear direction), another horizontal direction orthogonal to the X-direction is a Y-direction (width direction), and one direction orthogonal to the X-direction and the X-direction is a Z-direction (vertical direction).

For example, the product 1 is utilized as a filter of a touch panel sensor or a liquid crystal display device and includes a substrate 3 and a protrusion 5 having a predetermined shape (predetermined pattern).

Figure 1A:
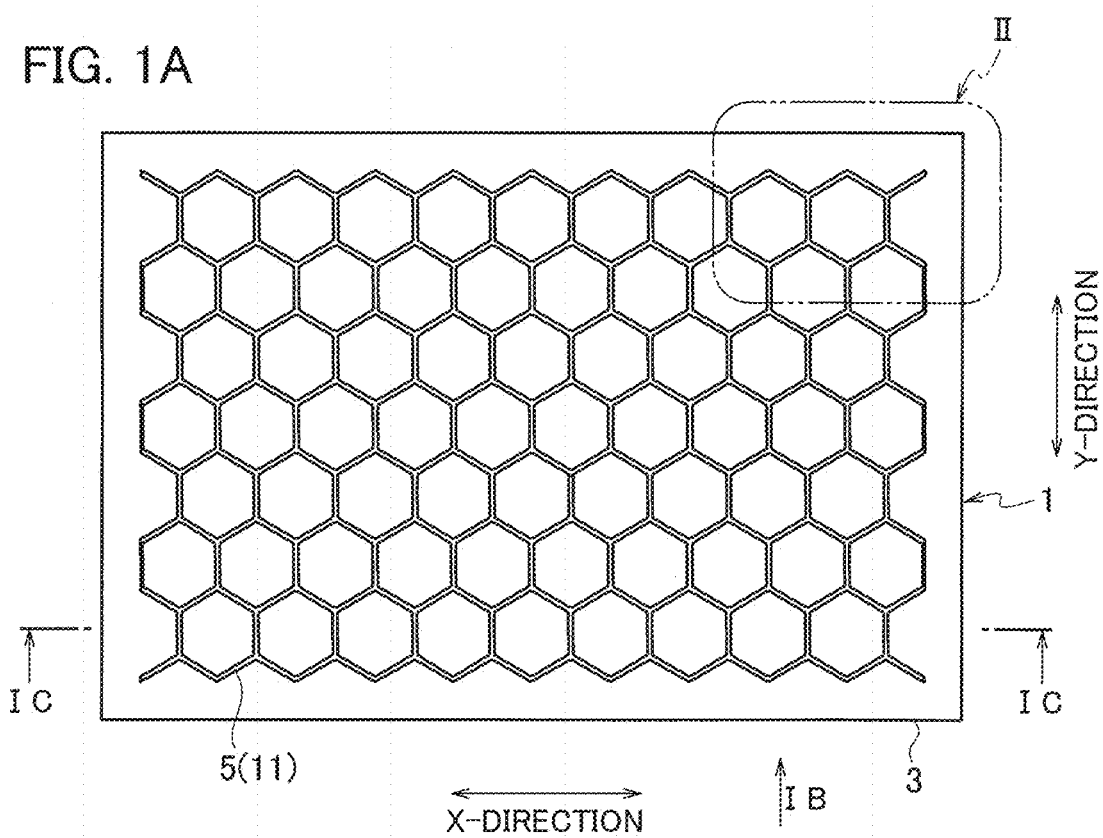
FIG. 1A is a view illustrating a product manufactured by a transfer method according to an embodiment.
Figure 1B:
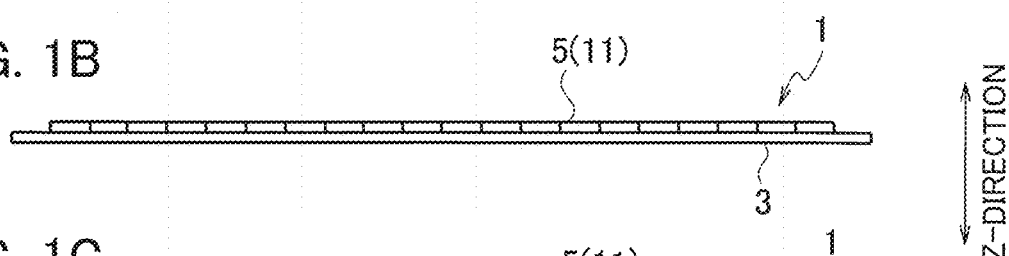
FIG. 1B is a view taken in the direction of an arrow IB of FIG. 1A.
Figure 1C:
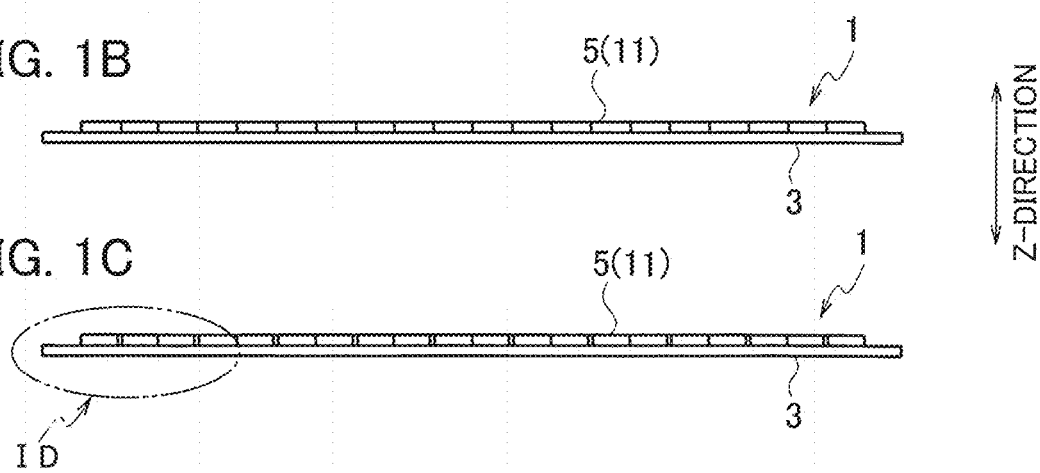
FIG. 1C is a view illustrating a cross section taken along a line IC-IC of FIG. 1A.
Figure 1D:
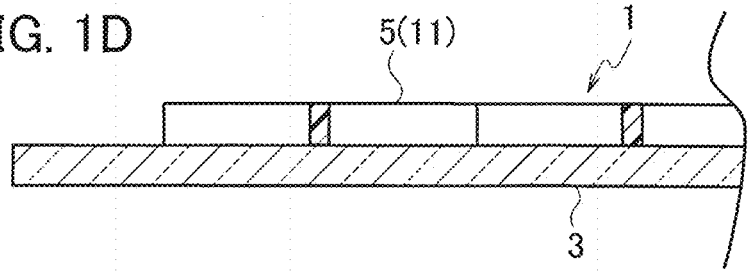
FIG. 1D is an enlarged view of an ID part of FIG. 1C.

For example, the substrate 3 is made of glass or synthetic resin. The protrusion 5 is formed by, for example, a material cured by irradiation with predetermined electromagnetic waves (e.g. cured ultraviolet curable resin). The protrusion 5 is formed so as to have a predetermined shape by transferring a transfer pattern 9 (see FIG. 3 etc.) formed on a mold 7. The protrusion 5 is provided on one surface of the substrate 3 in the thickness direction (Z-direction). FIG. 1A illustrates the protrusion 5 including a plurality of regular hexagonal sides are adjacent to each other.

Figure 2A:
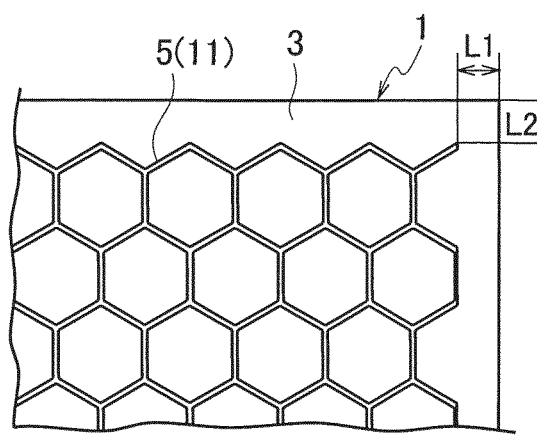
FIG. 2A is an enlarged view of a part II of FIG. 1, illustrating a case where the product is a good product.

Next, the position of the protrusion 5 with respect to the substrate 3 will be described. Here, it is assumed that the product 1 is regarded as a good product if the distances from the end faces of the substrate 3 up to the protrusion 5 are "L1" and "L2" as the design dimensions, as illustrated in FIG. 2A.

Figure 2B:
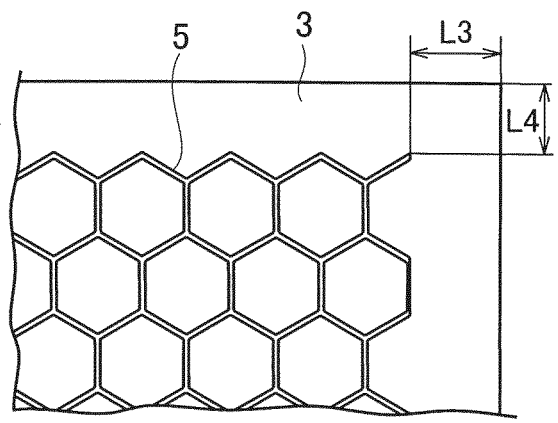
FIGS. 2B, 2C, and 2D are enlarged views of the part II of FIG. 1, illustrating a case where the product is an inferior product, respectively.
Figure 2C:
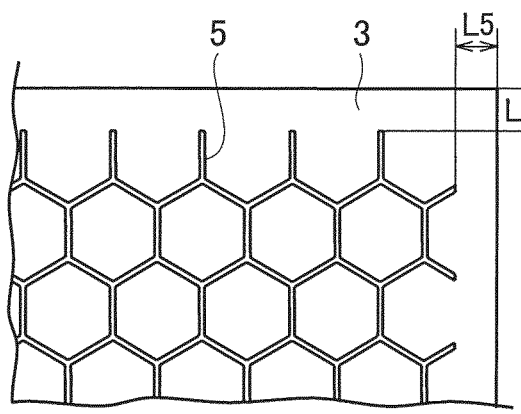
Figure 2D:
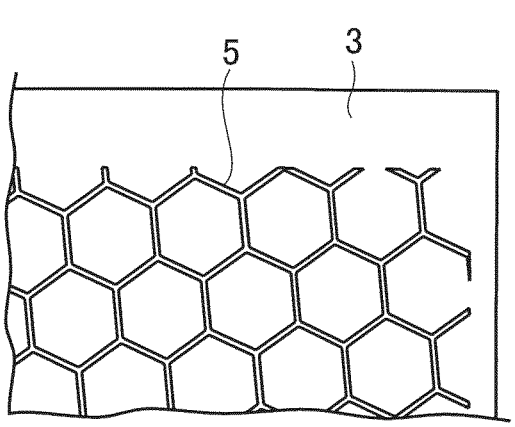

On the other hand, if the distances from the end surfaces of the substrate 3 are "L3" and "L4" (L3>L1, L4>L2) respectively as illustrated in FIG. 2B, if the distances from the end surface of the substrate 3 are "L5" and "L6" (L5<L1; L6<L2) as illustrated in FIG. 2C, or if the protrusion 5 is inclined obliquely as illustrated in FIG. 2D, then such products are regarded as defective products, respectively.

Next, the manufacturing method (transfer method) of the product 1 will be described.

First, it is performed to install the substrate 3 on a substrate installation unit 45 (substrate installation step). Here that the substrate 3 is provided, on its surface, with an uncured material (for example, uncured ultraviolet curable resin) 11 which can be cured by irradiation with electromagnetic waves of a predetermined wavelength (e.g. ultraviolet rays), For example, the substrate 3 is rectangular-shaped in a thin flat plate, and its thickness direction coincides with the Z-direction. The uncured ultraviolet curable resin 11 is arranged on an upper surface (e.g. its entire surface) of the substrate 3 and also provided in the form of a thin film.

Figure 3A:
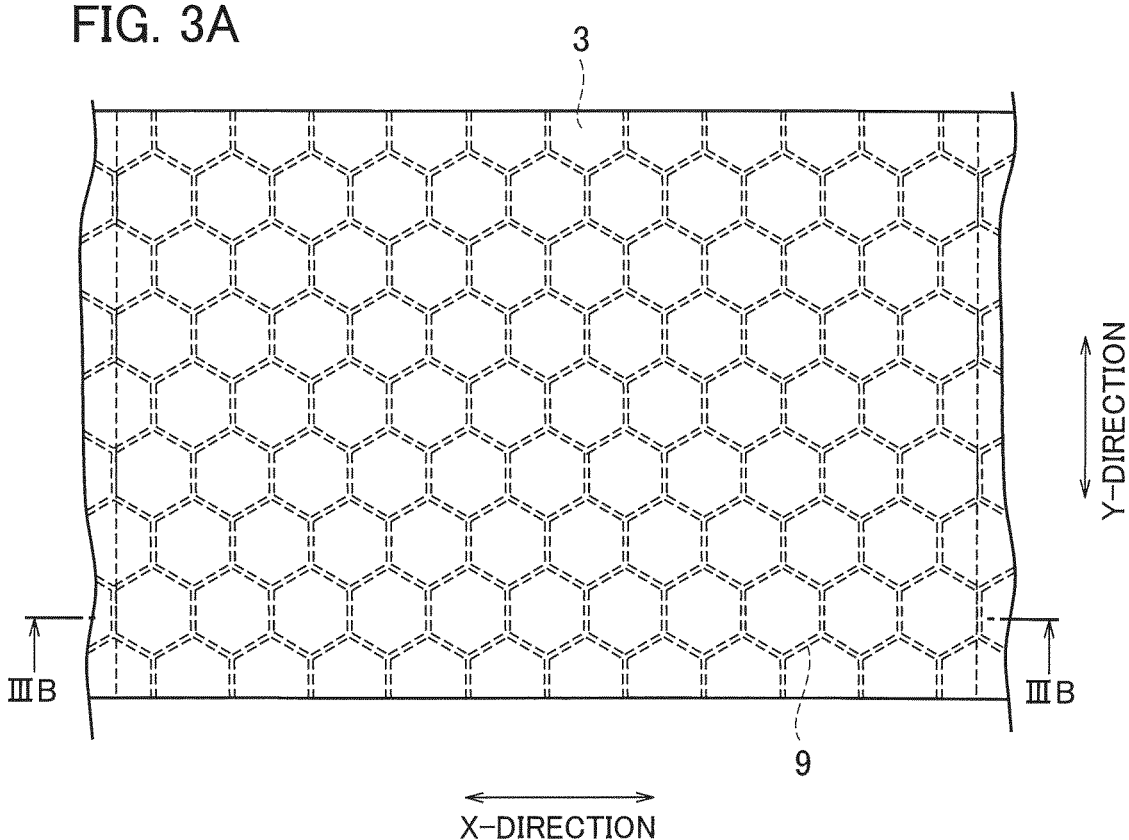
FIG. 3A is a view illustrating a manufacturing method of a product manufactured by the transfer method according to the embodiment.

Subsequently, in order to transfer the transfer pattern 9 of the mold 7 to the uncured ultraviolet curable resin 11, it is performed to press the mold 7 formed with the predetermined transfer pattern 9 against the substrate 3 provided with the uncured ultraviolet curable resin 11, as illustrated in FIG. 3 (mold pressing step).

The mold 7 is made of a material capable of transmitting ultraviolet rays. As illustrated in FIG. 3, a portion of the mold 7 to be pressed against the substrate 3 in the mold pressing step is made into a flat plate shape.

In a state where the mold 7 is pressed against the substrate 3 in the mold pressing step, the thickness directions of the substrate 3 and the mold 7 coincide with the Z-direction. In arrangement, the mold 7 is positioned on an upper side of the substrate 3.

Figure 3B:
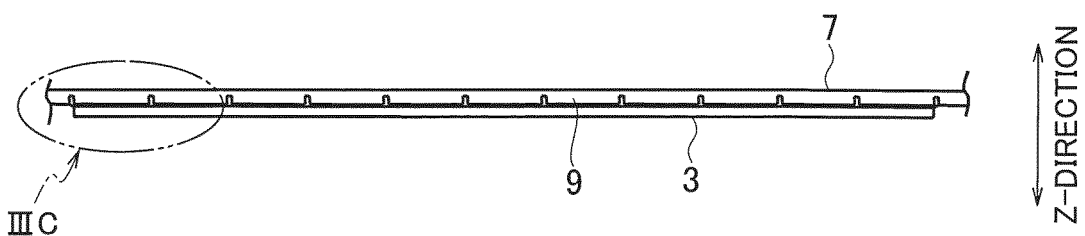
FIG. 3B is a cross sectional view taken along a line IIIB-IIIB of FIG. 3A.
Figure 3C:
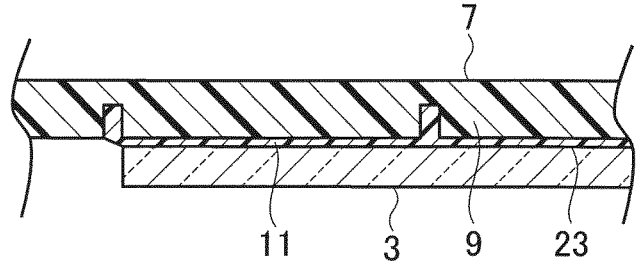
FIG. 3C is an enlarged view of a part IIIC of FIG. 3B.

In addition, the transfer pattern 9 formed on the lower surface of the mold 7 intrudes into the uncured ultraviolet curable resin 11 provided on the upper surface of the substrate 3 (see FIG. 3C). The transfer pattern 9 is formed by an unevenness of a predetermined shape which is slightly protruded or recessed in the Z-direction.

Besides, it is preferably that, before the mold pressing step of pressing the mold 7 against the substrate 3, the manufacturing method includes a step of: positioning the substrate 3 with respect to the mold 7 in directions (i.e. the X-direction and the Y-direction) orthogonal to the thickness directions of the substrate 3 and the mold 7; and also positioning the substrate 3 with respect to the mold 7 around an axis (C-axis) parallel to the Z-direction (substrate/mold positioning step).

Figure 4A:
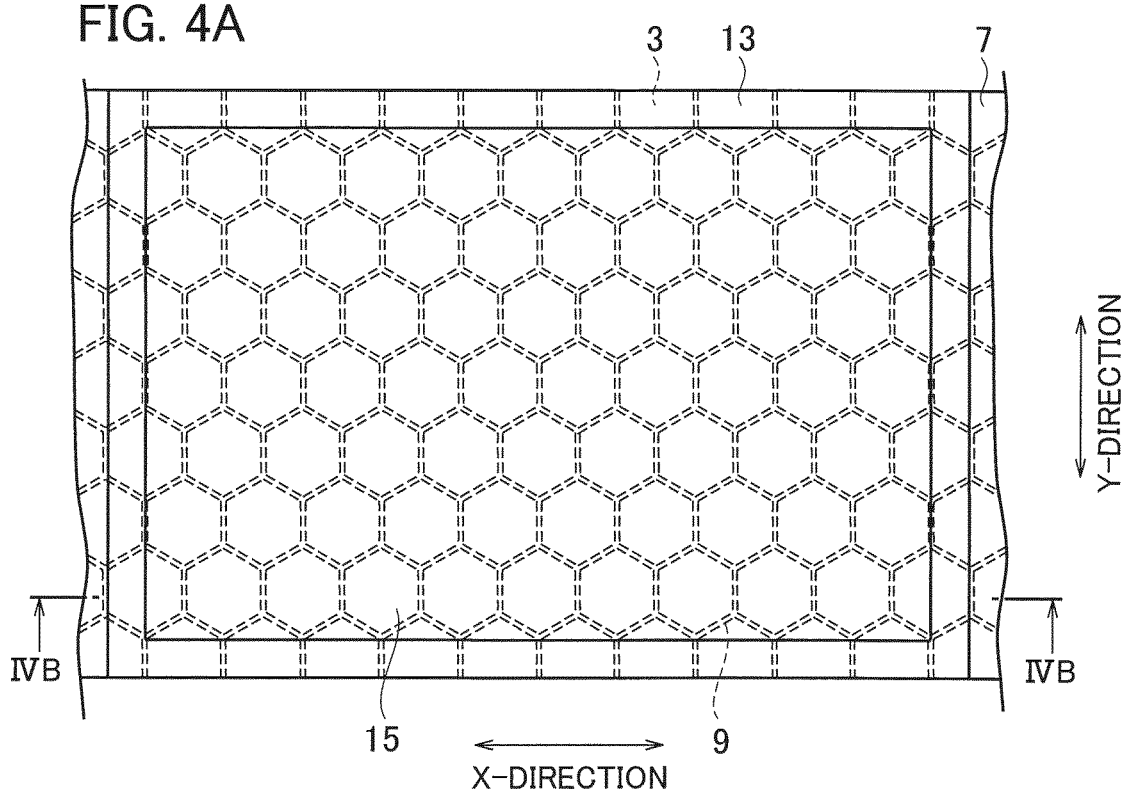
FIG. 4A is a view illustrating the manufacturing method of a product manufactured by the transfer method according to the embodiment.
Figure 4B:
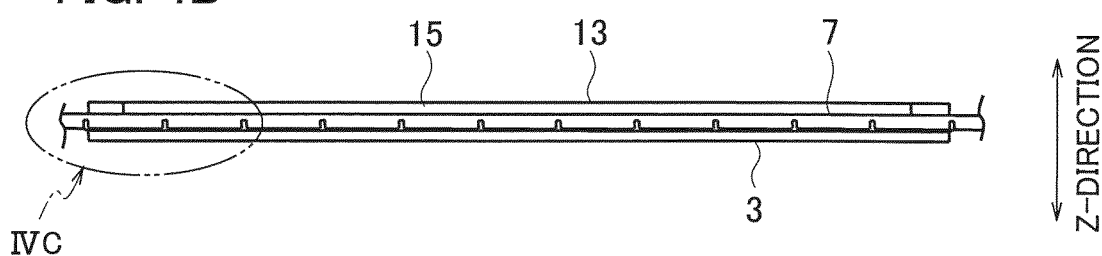
FIG. 4B is a cross sectional view taken along a line IVB-IVB of FIG. 4A.

Next, under condition of pressing the mold 7 against the substrate 3 in the mold pressing step, it is performed to position the mask unit 13 with respect to the substrate 3 and the mold 7, as illustrated in FIG. 4 (mask-unit positioning step).

Figure 17A:
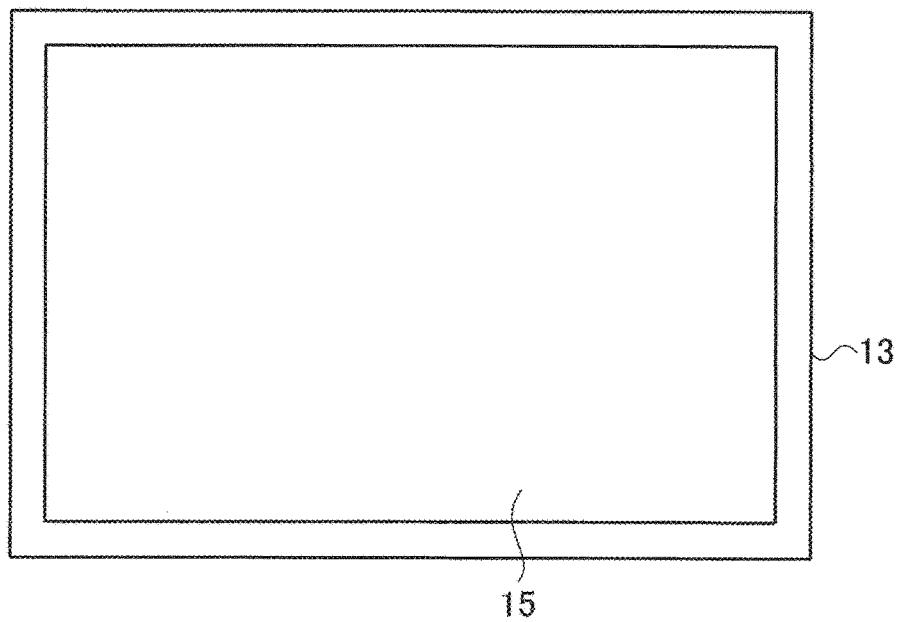
FIG. 17A is a view illustrating a mask unit used in the transfer method illustrated in FIG. 4A.

The mask unit 13 is formed with an electromagnetic-wave transmitting part (ultraviolet transmitting part) 15 of a predetermined shape, through which electromagnetic waves (for example, ultraviolet rays) of a predetermined wavelength are transmitted (see also FIG. 17A).

The mask unit 13 is formed in a thin flat plate shape and also provided with one ultraviolet transmitting part 15. However, the mask unit 13 may be provided with a plurality of ultraviolet transmitting parts 15. The ultraviolet transmitting part 15 penetrates the mask unit 13 in the thickness direction of the mask unit 13. In the mask unit 13, other parts than the ultraviolet transmitting part 15 (i.e. ultraviolet shielding parts) are adapted so as to shield ultraviolet rays.

As illustrated in FIGS. 4A and 17A, in the case where the ultraviolet transmitting part 15 of the mask unit 13 has a simple configuration such as a single rectangle, the ultraviolet transmitting part 15 may include a through-hole (i.e. a through-hole penetrating a solid part of the mask unit 13 in the thickness direction).

Alternatively, the mask unit 13 may include a flat plate which transmits ultraviolet rays and a thin ultraviolet shielding film which is formed on a lower (or an upper) surface of the flat plate and which does not transmit ultraviolet rays. In this case, a portion of the mask unit 13 where the thin ultraviolet shielding film is absent constitutes the ultraviolet transmitting part 15.

In a state where the mask unit 13 is installed in the mask-unit positioning step, the thickness directions of the substrate 3, the mold 7, and the mask unit 13 coincide with the Z-direction, respectively. In arrangement, the mask unit 13 is positioned on an upper side of the mold 7. In detail, the lower surface of the mask unit 13 is brought into contact with the upper surface of the mold 7, or the mold 7 is slightly separated from the mask unit 13.

In a state where the mask unit 13 is installed in the mask-unit positioning step, the positioning of the mask unit 13 with respect to the mold 7 and the substrate 3 is executed in the thickness directions (the Z-direction) of the substrate 3, the mold 7, and the mask unit 13, and also executed in orthogonal directions to the thickness directions of the substrate 3, the mold 7, and the mask unit 13 (i.e. the X-direction, the Y-direction).

In a state where the mask unit 13 is installed in the mask-unit positioning step, the positioning of the mask unit 13 with respect to the mold 7 and the substrate 3 is executed around an axis (C-axis) parallel to the Z-direction.

Subsequently, under the condition that the mask unit 13 has been positioned in the mask-unit positioning step, it is performed to irradiate ultraviolet rays to the uncured ultraviolet curable resin 11 installed on the substrate 3, through the ultraviolet transmitting part 15 of the mask unit 13 (irradiation step).

When irradiating ultraviolet rays in the irradiation step, it is preferable that the mold 7 is urged downward (toward the substrate 3) by the mask unit 13.

In the irradiation step, ultraviolet rays emitted downward from a light source located above the mask unit 13 (not illustrated in FIG. 4, an ultraviolet-ray generator unit 99 illustrated in FIG. 6 etc.) are transmitted through the ultraviolet transmitting part 15 of the mask unit 13 and the mold 7, and finally irradiated on the uncured ultraviolet curable resin 11. The irradiation of ultraviolet rays in the irradiation step is continued until the curing of the ultraviolet curable resin 11 is completed at the portion of the resin irradiated with ultraviolet rays.

Figure 4C:
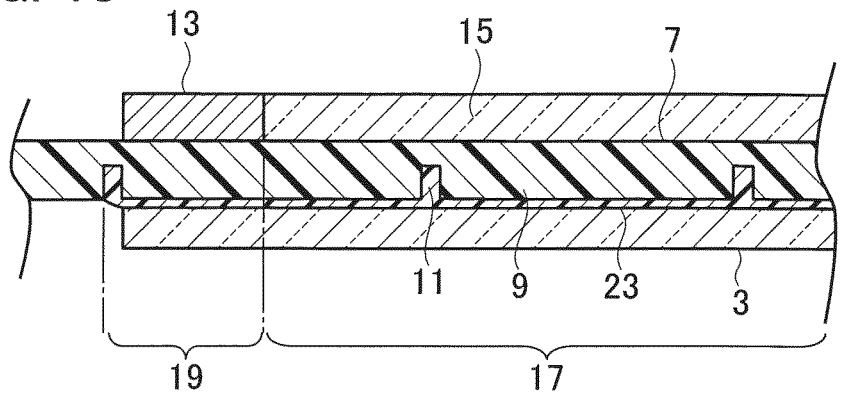
FIG. 4C is an enlarged view of a part IVC of FIG. 4B.

In a state where the irradiation of ultraviolet rays in the irradiation step has been completed, in the ultraviolet curable resin 11 installed on the substrate 3, the ultraviolet curable resin 11 is cured at the portion of the resin irradiated with the ultraviolet rays (i.e. a portion indicated with reference numeral 17 of FIG. 4C). However, at a portion of the resin where ultraviolet ray are not irradiated due to the presence of the mask unit 13 (i.e. a portion indicated with reference numeral 19 of FIG. 4C), the ultraviolet curable resin 11 remains uncured.

After the irradiation of ultraviolet rays in the irradiation step is completed, the mask unit 13 is removed (mask-unit removing step), and thereafter the mold 7 is peeled from the substrate 3 (the ultraviolet curable resin 11) (mold peeling step). After removing the mold in the mold peeling step, the uncured ultraviolet curable resin is removed (removing step). The uncured ultraviolet curable resin can be easily removed by an appropriate operation, for example, wiping.

Figure 5A:
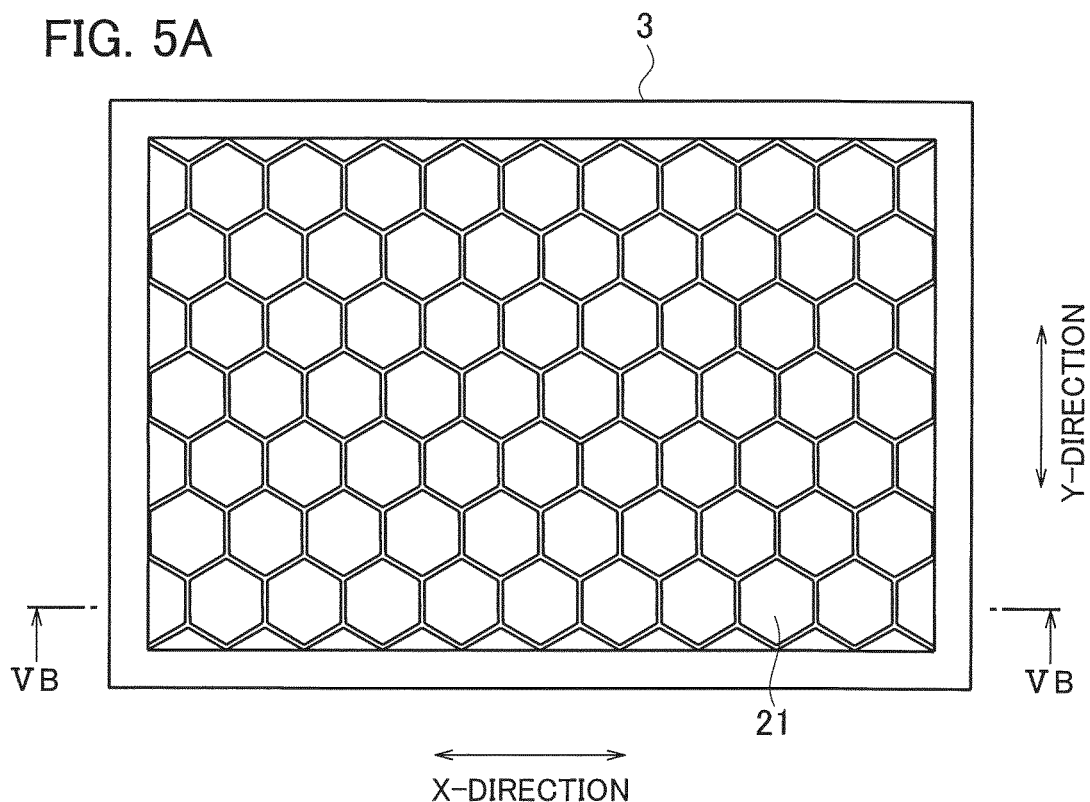
FIG. 5A is a view illustrating the manufacturing method of a product manufactured by the transfer method according to the embodiment.
Figure 5B:
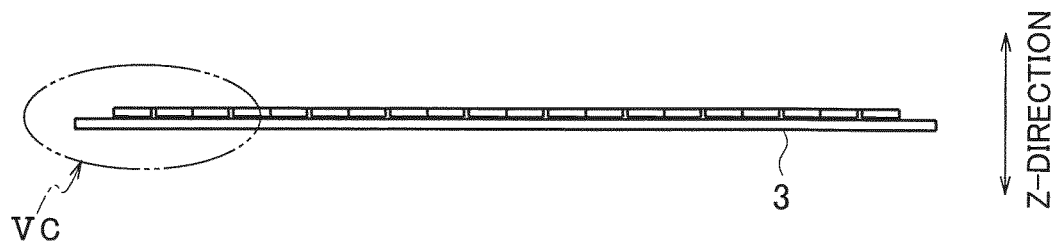
FIG. 5B is a cross sectional view taken along a line VB-VB of FIG. 5A.
Figure 5C:
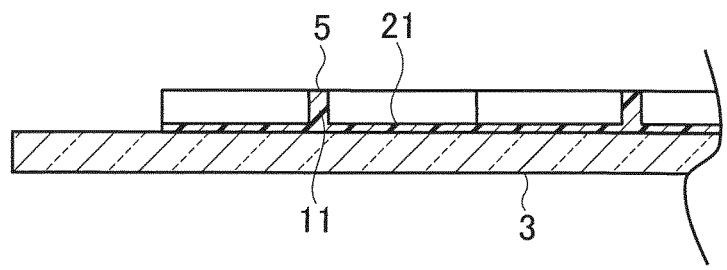
FIG. 5C is an enlarged view of a part VC of FIG. 5B.
Figure 7:
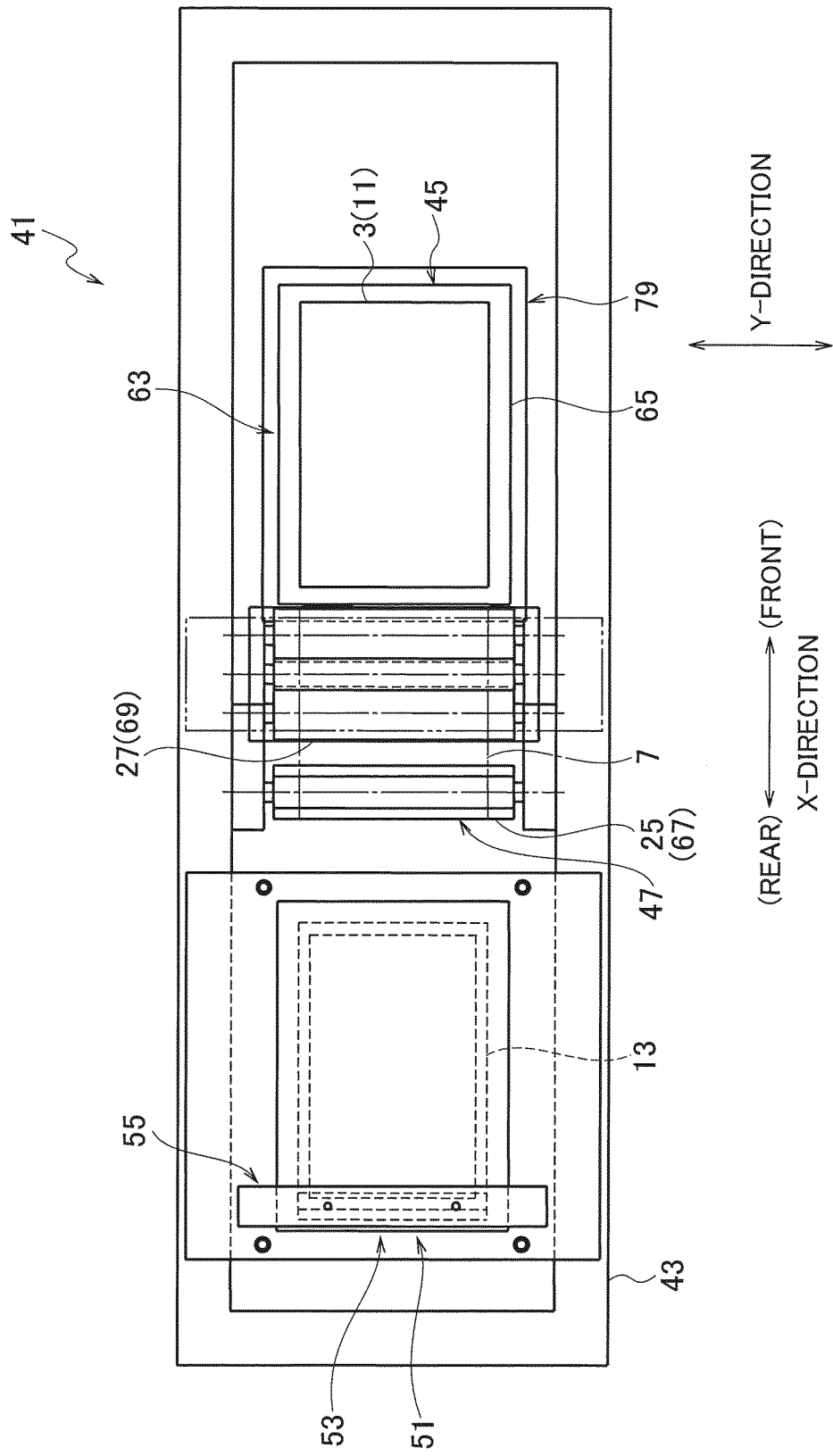
FIG. 7 is a top view as viewed in the direction of an arrow VII of FIG. 6.
Figure 8:
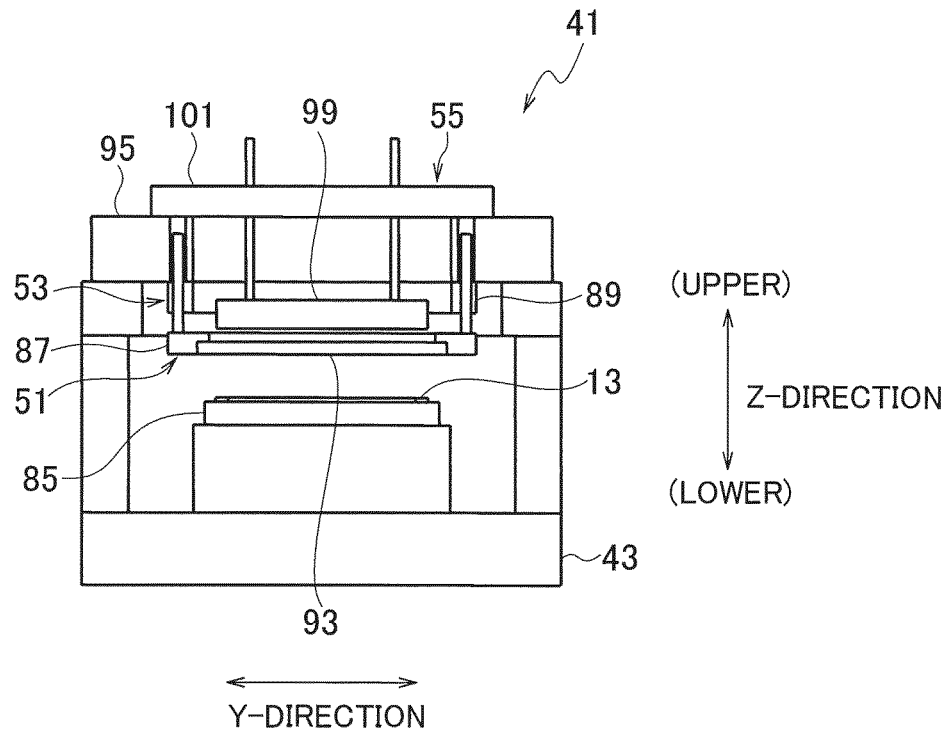
FIG. 8 is a cross sectional view taken along a line VIII-VIII of FIG. 6.
Figure 9:
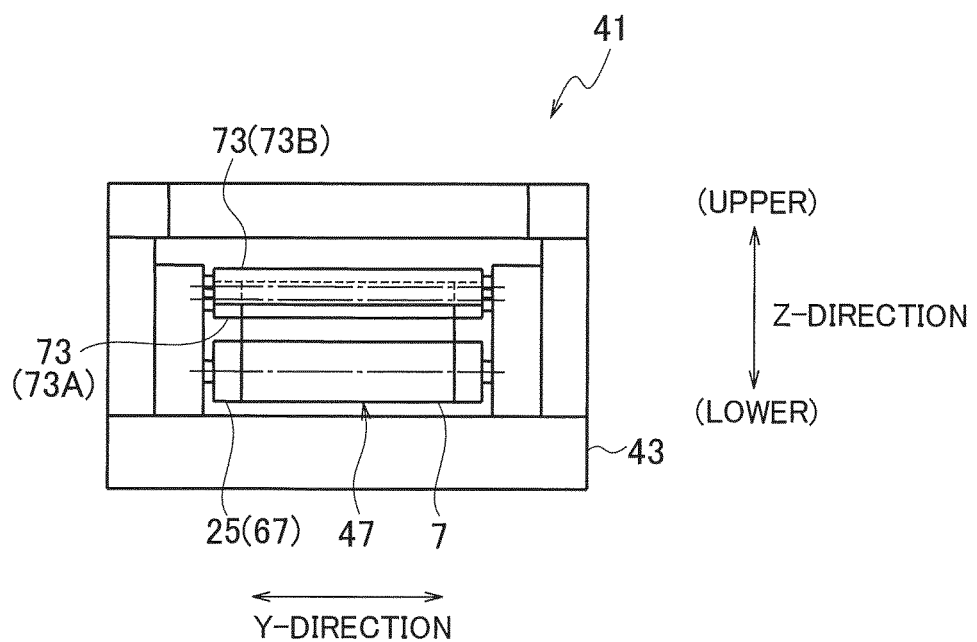
FIG. 9 is a cross sectional view taken along a line IX-IX of FIG. 6.
Figure 10:
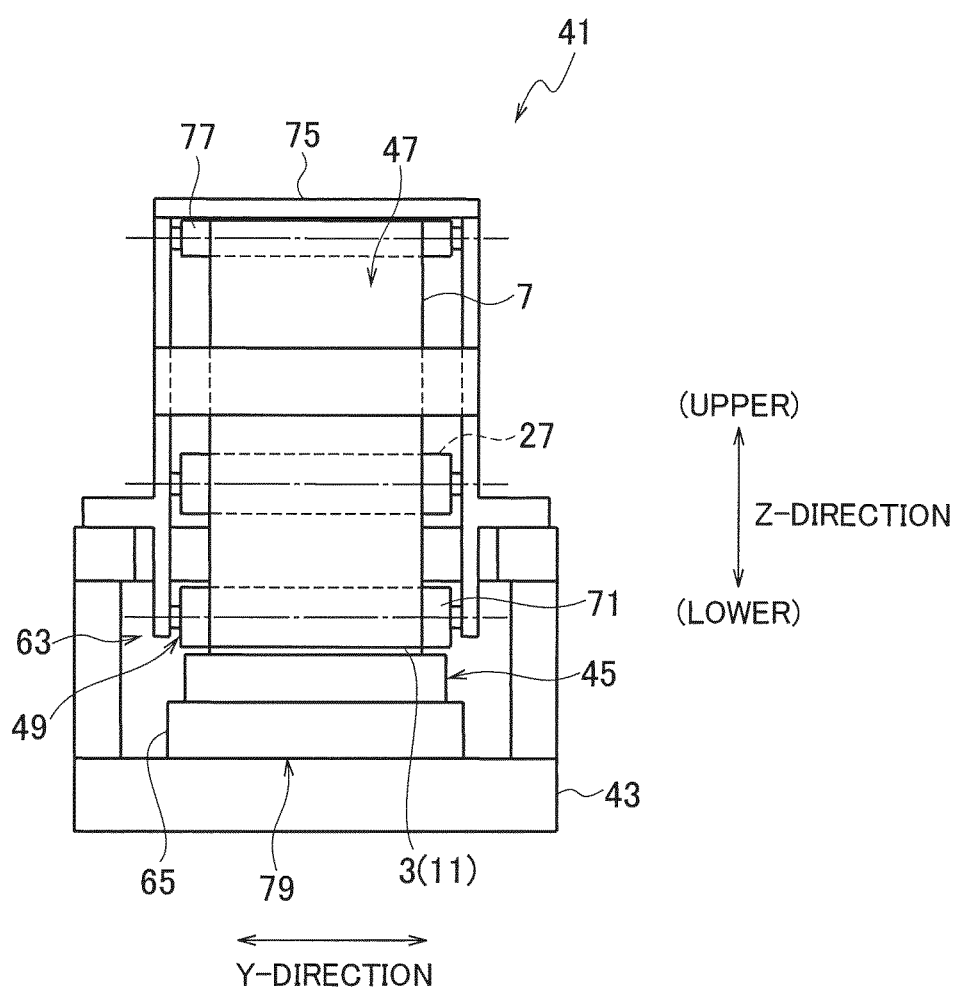
FIG. 10 is a cross sectional view taken along a line X-X of FIG. 6.

The state of the product after removing of the uncured ultraviolet curable resin will be described. In this state, as illustrated in FIG. 5C, lower residual film parts 21 besides the protrusion 5 may be formed on the upper surface of the substrate 3. The reason why the residual film parts 21 are formed is because gaps 23 are generated between the lower ends of respective protrusion 5 of the transfer pattern 9 of the mold 7 and the upper surface of the substrate 3, so that the ultraviolet curable resin 11 may enter the gaps 23, as illustrated in FIGS. 3C and 4C.

If such residual film parts 21 are produced despite their unnecessity, the residual film parts 21 would be removed by ashing (e.g. $O_2$-ashing) or the like (residual-film-part removing step). In this way, the product 1 illustrated in FIG. 1 is produced.

The pattern formed by the ultraviolet curable resin 11 set on the substrate 3 (i.e. a form of the protrusion 5) becomes opposite to the transfer pattern 9 formed in the mold 7.

In a state where the positioning of the mask unit 13 in the mask-unit positioning step is completed, the ultraviolet transmitting part 15 of the mask unit 13 is located inside an area of the mold 7 formed with the transfer pattern 9.

We now explain in more detail. When viewing the state on completion of the mold pressing step from the upper side of the mold 7, the area of the mold 7 formed with the transfer pattern 9 covers all the substrate 3 or a part of the substrate 3. Additionally, when viewing the state on completion of the mask-unit positioning step from the upper side of the mask unit 13, the transfer pattern 9 of the mold 7 is present in all the ultraviolet transmitting parts 15 of the mask unit 13 since the ultraviolet transmitting part 15 of the mask unit 13 is located inside the area of the mold 7 formed with the transfer pattern 9.

For example, as illustrated in FIG. 4A, in an embodiment where one ultraviolet transmitting part 15 having a rectangular shape is formed at the center part of the mask unit 13, the transfer pattern 9 of the mold 7 is present over the entire area of the single ultraviolet transmitting part 15 of the mask unit 13.

As illustrated in FIG. 6 and the like, the mold 7 is provided in the form of an elongated sheet (belt-like shape) having a predetermined width and a predetermined length, and also wound up into a roll, thereby providing a mold rolled web 25. Extended from the mold rolled web 25 is a longitudinal part of the mold 7 whose leading part delivered from the mold rolled web 25 is then wound to form a winding roller 27.

While performing the mold pressing step, the portion of the mold 7, which extends in the form of a flat plate without producing any slack between the mold rolled web 25 and the winding roller 27 (i.e. an intermediate portion of the mold 7 in the longitudinal direction) is pressed against the substrate 3.

Figure 17B:
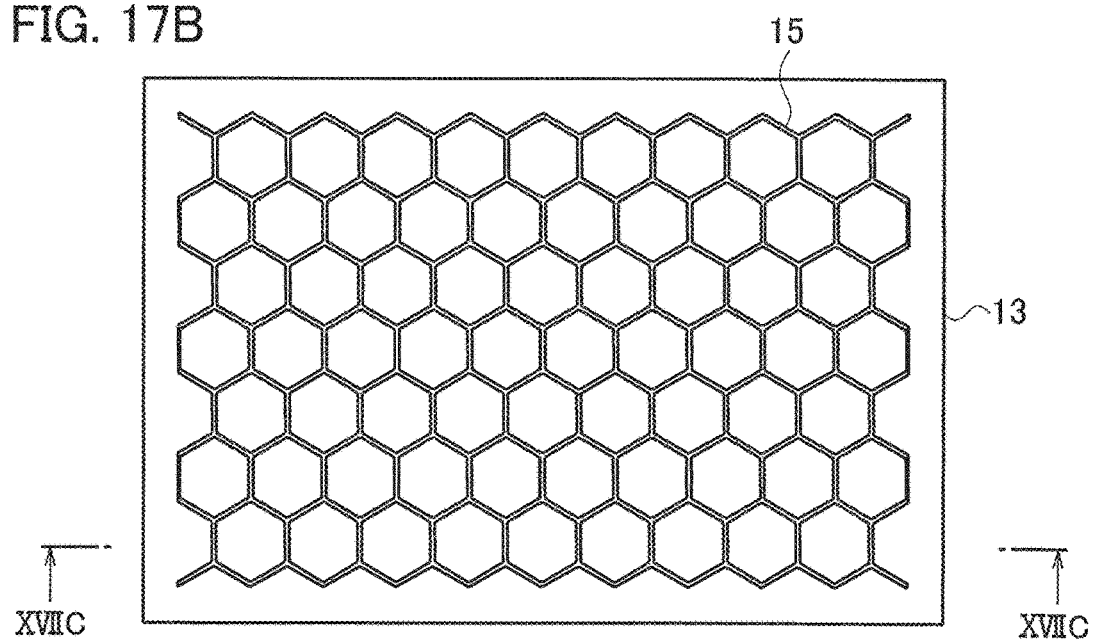
FIG. 17B is a view illustrating a mask unit according to the modification.
Figure 17C:
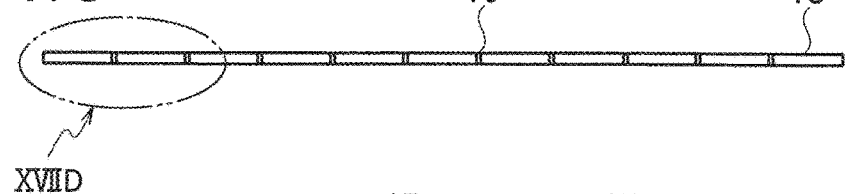
FIG. 17C is a cross sectional view taken along a line XVIIC-XVIIC of FIG. 17B.
Figure 17D:
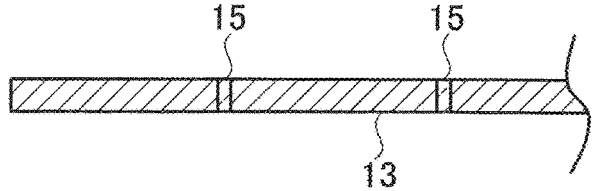
FIG. 17D is an enlarged view of a part XVIID of FIG. 17C.

In the above description, the ultraviolet transmitting part 15 of the mask unit 13 is formed in one rectangle, as illustrated in FIGS. 4A and 17A. In the modification, however, the shape of the ultraviolet transmitting part 15 of the mask unit 13 may coincide with the shape of the transfer pattern 9 of the mold 7, as illustrated in FIGS. 17B, 17C, and 17D.

Figure 18A:
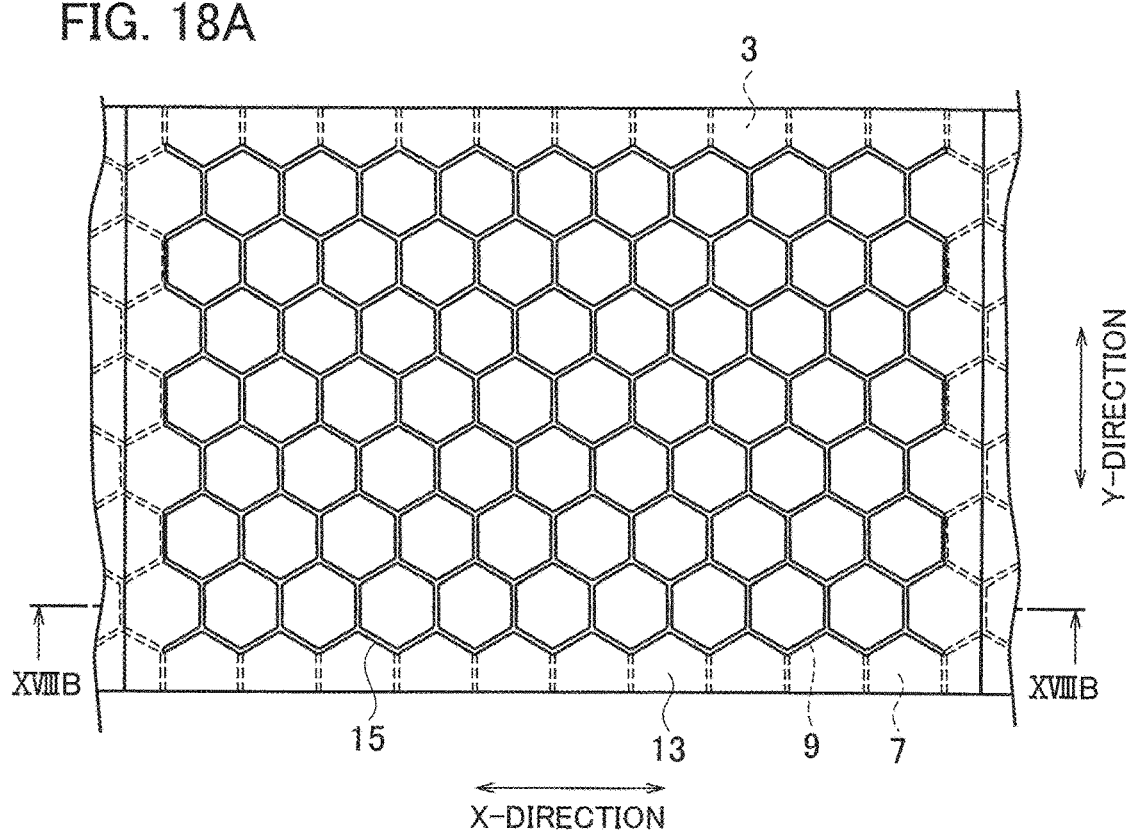
FIG. 18A is a view illustrating a transfer method using the mask unit illustrated in FIGS. 17B to 17D.
Figure 18B:
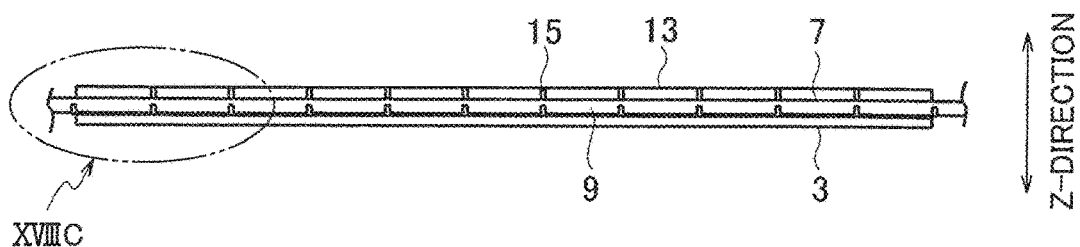
FIG. 18B is a cross sectional view taken along a line XVIIIB-XVIIIB of FIG. 18A.
Figure 18C:
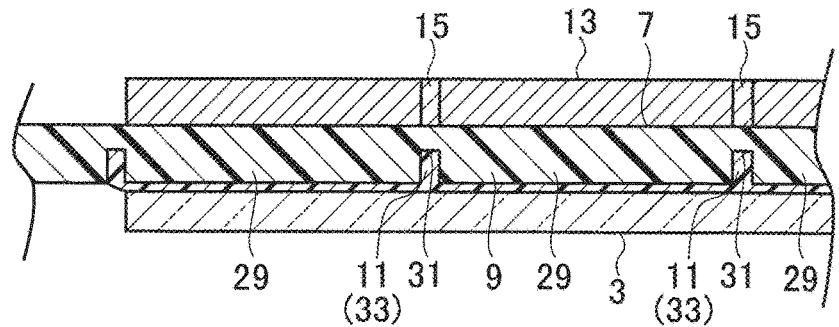
FIG. 18C is an enlarged view of a part XVIIIC of FIG. 18B.

In the mask-unit positioning step, as illustrated in FIGS. 18A to 18C, the position of the ultraviolet transmitting part 15 of the mask unit 13 may be made to coincide with the position of the transfer pattern 9 of the mold 7.

Here, the case of making the position of the ultraviolet transmitting part 15 of the mask unit 13 coincide with the position of the transfer pattern 9 of the mold 7 in the mask-unit positioning step will be described in more detail.

As illustrated in FIG. 18C, the transfer pattern 9 of the mold 7 includes protruding parts 29 protruding from the lower surface of the mold 7 and non-protruding parts 31 that do not protrude from the lower surface of the mold 7. Then, when the mold pressing step is performed, the protruding parts 29 and the substrate 3 are separated from each other in the Z-direction slightly, so that the uncured ultraviolet curable resin (not illustrated) is somewhat present between the protruding parts 29 and the substrate 3. Nevertheless, there may be a case that the protruding parts 29 are brought into contact with the substrate 3 in a state where the mold pressing step is performed. In such a case, the uncured ultraviolet curable resin 11 would be substantially absent between the protruding parts 29 and the substrate 3.

Meanwhile, in a state where the mold pressing step is performed, the non-protruding parts 31 are separated from the substrate 3, so that portions 33 between the non-protruding parts 31 and the substrate 3 are filled up with the uncured ultraviolet curable resin 11.

As illustrated in FIG. 18A, when viewing the state on completion of the mask-unit positioning step from the upper side of the mask unit 13, the ultraviolet transmitting part 15 of the mask unit 13 overlaps the non-protruding parts 31 of the mold 7, while parts of mask unit 13 that do not transmit ultraviolet rays overlap the protruding parts 29

As a result, when ultraviolet rays are irradiated through the ultraviolet transmitting part 15 of the mask unit 13 and the non-protruding parts 31 of the mold 7, the ultraviolet curable resin 11 filling the portions 33 between the non-protruding parts 31 and the substrate 3 are cured to produce the protrusion 5 of the product 1, while the ultraviolet curable resin 11 in the other portions is not cured.

Thereafter, when the mold 7 is peeled from the substrate 3, and additionally the uncured ultraviolet curable resin 11 is removed from the substrate 3, the product 1 without the residual film parts 21 as illustrated in FIG. 1 can be obtained.

Figure 19:
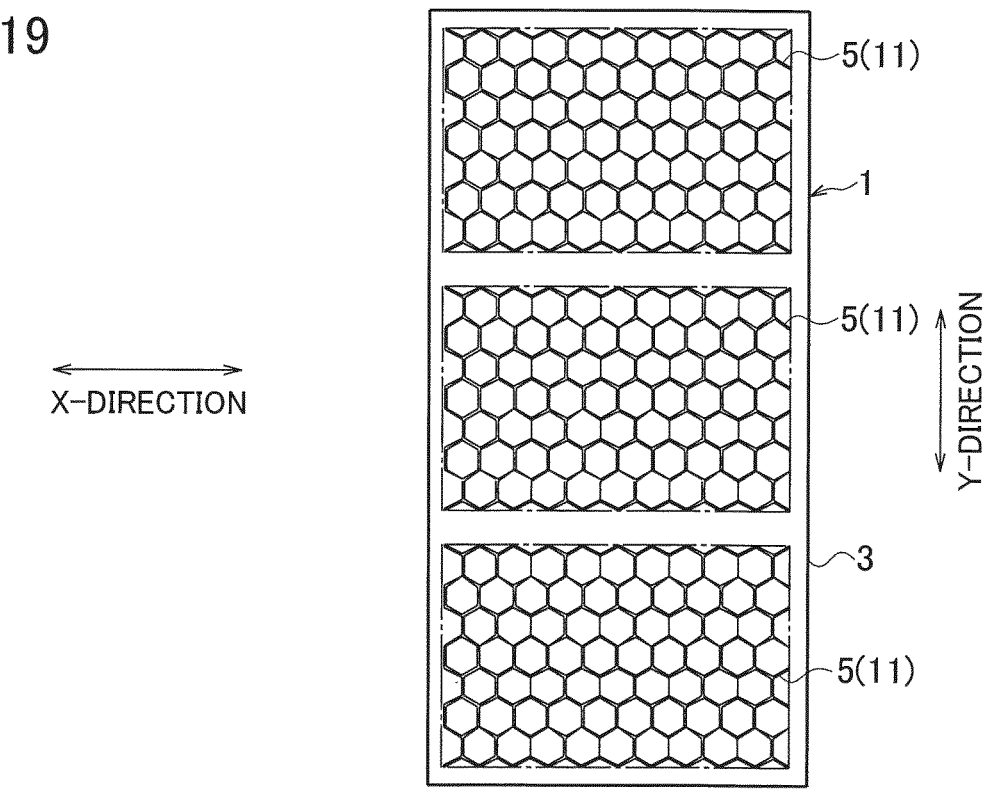
FIG. 19 is a view illustrating a case where transfer patterns are transferred onto a plurality of parts on one substrate.
Figure 20:
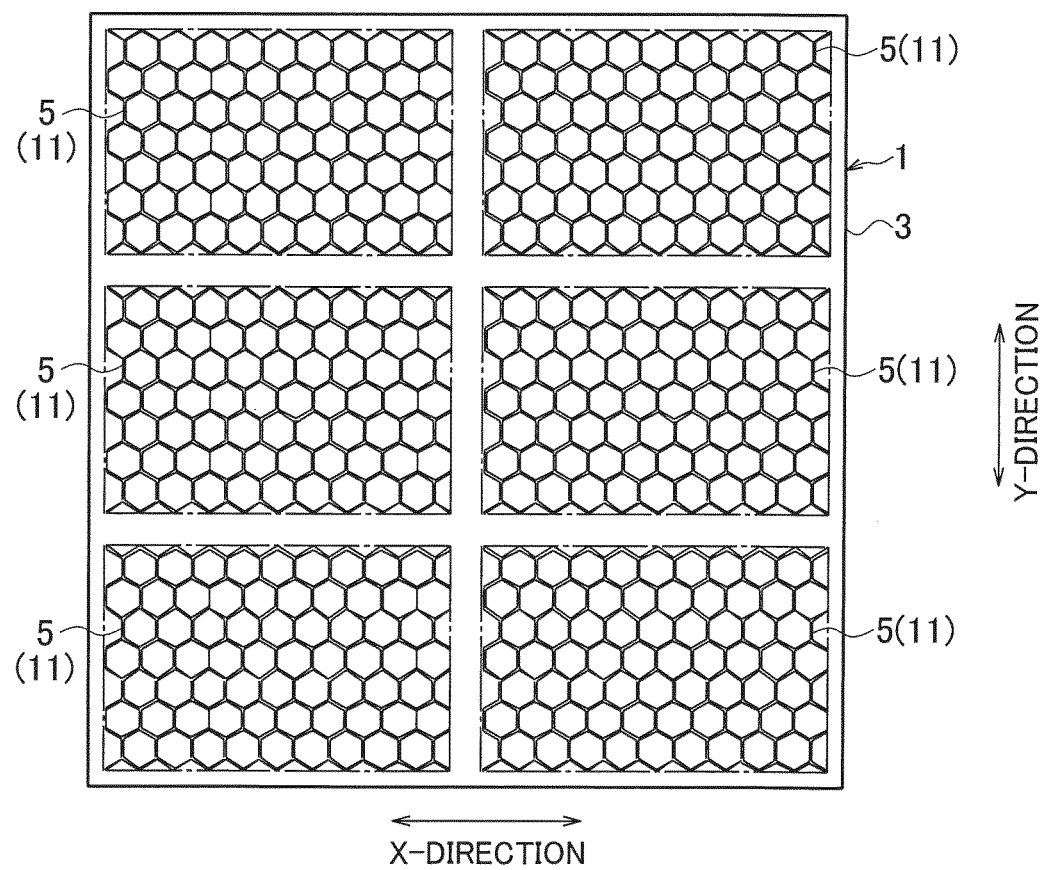
FIG. 20 is a view illustrating a case where transfer patterns are transferred onto a plurality of parts on one substrate.

Besides, as illustrated in FIGS. 19 and 20, the single substrate 3 may be formed with a plurality of protrusions 5 of a predetermined shape by performing the transfer operations using the mold 7 to one substrate 3 a plurality of times.

That is, by making the substrate 3 somewhat larger than a multiple of the size of the transfer pattern 9 of the mold 7, the uncured ultraviolet curable resin 11 is provided at a plurality of places of the substrate 3, or the uncured ultraviolet curable resin 11 is provided on the entire surface of the substrate 3.

Then, by repeating the substrate/mold positioning step, the mold pressing step, the mask-unit positioning step and the irradiation step a plurality of times while changing the position of the substrate 3 with respect to the mold 7, the transfer pattern 9 may be transferred at several positions of the ultraviolet curable resin 11 provided on the substrate 3.

Here, a transfer apparatus 41 for carrying out the above-described transfer method will be described.

As illustrated in FIGS. 6 to 10, the transfer apparatus 41 includes a base body 43, a substrate installation unit 45, a mold installation unit 47, a mold presser unit 49, a mask-unit installation unit 51, a mask-unit (first) positioning unit 53, an irradiation unit 55 and a control unit 57.

The substrate installation unit 45 is mounted on the base body 43. The substrate 3 in the form of e.g. a rectangular flat plate is installed on the substrate installation unit 45. The thickness direction of the substrate 3 installed on the substrate installation unit 45 coincides with the Z-direction. The substrate 3 is provided, on its upper surface (e.g. the whole upper surface), with the uncured ultraviolet curable resin 11 in the form of a thin film, which can be cured by irradiation with ultraviolet rays.

The mold installation unit 47 is also mounted on the base body 43. The mold 7 formed with the predetermined transfer pattern 9 is installed on the mold installation unit 47.

The mold presser unit 49 is also mounted on the base body 43. In order to transfer the transfer pattern 9 of the mold 7 to the substrate 3 provided with the uncured ultraviolet curable resin 11, the mold presser unit 49 presses the mold 7 installed on the mold installation unit 47 against the substrate 3 (i.e. the ultraviolet curable resin 11 of the substrate 3) which is provided with the uncured ultraviolet curable resin 11 and also installed on the substrate installation unit 45.

When being pressed by the mold presser unit 49, the thickness direction of the mold 7 coincides with the Z-direction, and the predetermined transfer pattern 9 is located on the lower surface of the mold 7.

The mask-unit installation unit 51 is also mounted on the base body 43. In the mask-unit installation unit 51, there is installed the mask unit 13 which is formed with the ultraviolet transmitting part 15 of a predetermined shape.

The mask-unit positioning unit 53 is also mounted on the base body 43. The mask-unit positioning section 53 serves to position the mask unit 13 installed in the mask-unit installation unit 51 with respect to the substrate 3 installed on the substrate installation unit 45 and also the mold 7 installed on the mold installation unit 47.

The irradiation unit 55 is also mounted on the base body 43. The irradiation unit 55 irradiates ultraviolet rays toward the ultraviolet curable resin 11 of the substrate 3 installed on the substrate installation unit 45. Ultraviolet rays are irradiated on the ultraviolet curable resin 11 through both the ultraviolet transmitting part 15 of the mask unit 13 installed in the mask-unit installation unit 51 and the mold 7 pressed against the substrate 3 on the substrate installation unit 45 by the mold presser unit 49.

The transfer apparatus 41 is provided with a substrate/mold (second) positioning unit 63. The substrate/mold positioning unit 63 is mounted on the base body 43 to position the substrate 3 installed on the substrate installation unit 45 with respect to the mold 7 installed on the mold installation unit 47.

The control unit 57 includes a CPU 59 and a memory 61.

Provided that: the substrate 3 having the uncured ultraviolet curable resin 11 is installed on the substrate installation unit 45; the mold 7 is installed on the mold installation unit 47; and the mask unit 13 installed in the mask-unit installation unit 51, the control unit 57 is configured to control the operations of the mold presser unit 49, the mask-unit positioning unit 53, and the irradiation unit 55, as described below.

Before pressing the mold 7 against the substrate 3 by the mold presser unit 49, it is performed to position the substrate 3 with respect to the mold 7 in orthogonal directions (the X-direction, the Y-direction) to the Z-direction of the substrate 3 and the mold 7. At this time, the substrate 3 is also positioned with respect to the mold 7 in the axis (C-axis) of the operation rotating about the axis parallel to the Z-direction.

Subsequently, the mold 7 is pressed against the substrate 3 (the uncured ultraviolet curable resin 11 on the surface of the substrate 3) by the mold presser unit 49, and the positioning of the mask unit 13 with respect to the substrate 3 and the mold 7 is performed by the mask-unit positioning unit 53. Thereafter, the irradiation unit 55 irradiates ultraviolet rays toward the ultraviolet curable resin 11 of the substrate 3 installed on the substrate installation unit 45.

Next, with use of the mold presser unit 49, the mold 7 is peeled from the cured ultraviolet curable resin 11 on the surface of the substrate 3.

As described above, when the shape of the ultraviolet transmitting part 15 of the mask unit 13 coincides with the shape of the transfer pattern 9 of the mold 7, the control unit 57 controls the operation of the mask-unit positioning unit 53 so that the position of the ultraviolet transmitting part 15 of the mask unit 13 and the position of the transfer pattern 9 of the mold 7 are aligned with each other, prior to the irradiation of ultraviolet rays at the irradiating unit 55.

In the transfer apparatus 41, as described above, the plurality of protrusions 5 of a predetermined shape may be formed on the single substrate 3 by applying the transfer operation using the mold 7 to the single substrate 3 a plurality of times, as illustrated in FIGS. 19 and 20.

In other words, the transfer apparatus 41 may be configured to allow the substrate 3 installed on the substrate installation unit 45 to be movable to the mold 7 installed on the mold installation unit 47 in the X-direction and the Y-direction. Then, in a state where: the substrate 3 is installed on the substrate installation unit 45; the mold 7 is installed on the mold installation unit 47; and the mask unit 13 is installed in the mask-unit installation unit 51, the control unit 57 may control the operations of the mold presser unit 49, the mask-unit positioning unit 53, the irradiation unit 55, and the substrate installation unit 45, as described below.

It is performed to repeat the respective operations of: positioning the substrate 3 installed on the substrate installation unit 45 with respect to the mold 7 installed on the mold installation unit 47 by the substrate/mold positioning unit 63; pressing the mold 7 against the substrate 3 by the mold presser unit 49; positioning of the mask unit 13 with respect to the substrate 3 and the mold 7 by the mask-unit positioning unit 53; and sequentially irradiating the ultraviolet rays toward the ultraviolet curable resin 11 of the substrate 3 installed on the substrate installation unit 45, a plurality of times while changing the position of the substrate 3 with respect to the mold 7. In this way, as illustrated in FIGS. 19 and 20, the transfer pattern 9 may be transferred to the ultraviolet curable resins 11 provided on the substrate 3 at a plurality of positions.

Alternatively, by superimposing one mask unit 13 on one transfer pattern 9, a plurality of transfer patterns may be formed in a divided shape. That is, in the modification illustrated in FIG. 19, the transfer pattern is transferred on one substrate 3 at three places separated from each other by performing a series of operations of: positioning the substrate 3; pressing the mold 7 against the substrate 3 to position the mask unit 13 with respect to the substrate 3 and the mold 7; and subsequently operating the irradiation unit 55 to irradiate the ultraviolet rays toward the ultraviolet curable resin 11 of the substrate 3 installed on in the substrate installation unit 45, only once. Further, in the modification illustrated in FIG. 20, the transfer pattern is transferred to one substrate 3 at six positions separated from each other, as similar to the modification illustrated in FIG. 19.

In the case of dividing one pattern into a plurality of pieces, as described above, it is necessary to prevent respectively-divided transfer patterns from being missed.

Here, the transfer apparatus 41 will be described with reference to FIGS. 6 to 10, in more detail.

As described above, the transfer apparatus 41 includes the base body 43, the substrate installation unit 45, the mold installation unit 47, the mold presser unit 49, the mask-unit installation unit 51, the mask-unit positioning unit 53, the substrate/mold positioning unit 63, the irradiation unit 55, and the control unit 57.

The substrate installation unit 45 includes a substrate installation body 65 whose upper surface is flat. The substrate 3 is mounted so that the lower surface of the substrate 3 comes into contact with the upper surface of the substrate installation body 65 and further installed integrally with the substrate installation body 65 by, for example, vacuum sucking.

The carrying-in of the substrate 3 into the substrate installation unit 45 and the carrying-out of the substrate 3 from the substrate installation unit 45 are performed by a substrate conveyer apparatus (not illustrated), for example, a robot or the like. Additionally, it is assumed that the positioning of the substrate 3 with respect to the substrate installation body 65 has been completed at the time when the substrate 3 is carried into the substrate installation body 65 by the substrate conveyer apparatus (not illustrated).

The mold installation unit 47 includes a mold-web installation part 67 in which the mold rolled web 25 is installed and a winding-roller installation part 69 in which the winding roller 27 is installed. The mold 7 is unwound from the mold rolled web 25 installed in the mold-web installation part 67, and the leading end of the unwound portion of the mold 7 is wound up by the winding roller 27 installed in the winding-roller installation part 69. Further, a part of the mold 7 extends in the form of a flat plate with no slack between the mold rolled web 25 and the winding roller 27.

The mold presser unit 49 includes a columnar presser roller 71, three columnar guide rollers 73 (73A, 73B, 73C) and a presser-roller support 75. On the side of the mold rolled web 25 and the mold-web installation part 67, the first guide roller 73A and the second guide roller 73B are provided on the base body 43 so as to be rotatable about center axes extending in the Y-direction as the center of rotation.

On the side of the presser roller 71 and the winding-roller installation part 69, the third guide roller 73 C and the winding roller 27 are provided on the presser-roller support 75 so as to be rotatable about a central axis extending in the Y-direction.

The mold-web installation part 67, the first guide roller 73A, and the second guide roller 73B are positioned on the rear side of the presser roller 71, while the third guide roller 73C is positioned on the upper side of the presser roller 71. The winding-roller installation part 69 is located on the rear side of the third guide roller 73C.

The mold 7 extending with no slack between the mold rolled web 25 placed on the mold-web installation part 67 and the winding roller 27 of the winding-roller installation part 69 is wound around the first guide roller 73A, the second guide roller 73B, the presser roller 71, the third guide roller 73C, and a columnar dancer roller 77, in this order. Details of the dancer roller 77 will be described later.

The presser-roller support 75 is supported by the base body 43 so as to be movable in the X-direction. The presser-roller support 75 is moved by an actuator (not illustrated), for example, a linear motor constituting a presser-roller driving unit 107 or the like.

The presser roller 71, the third guide roller 73C, the dancer roller 77, and the winding roller 27 of the winding-roller installation part 69 move together with the presser-roller support 75.

The mold 7 to be wound around the presser roller 71 comes into contact with the presser roller 71 at its lower end. With the movement of the presser-roller support 75, the presser roller 71 moves between a pressing start position (the position illustrated with FIG. 6) and a pressing end position (the position illustrated with FIG. 11) in the X-direction.

Figure 15A:
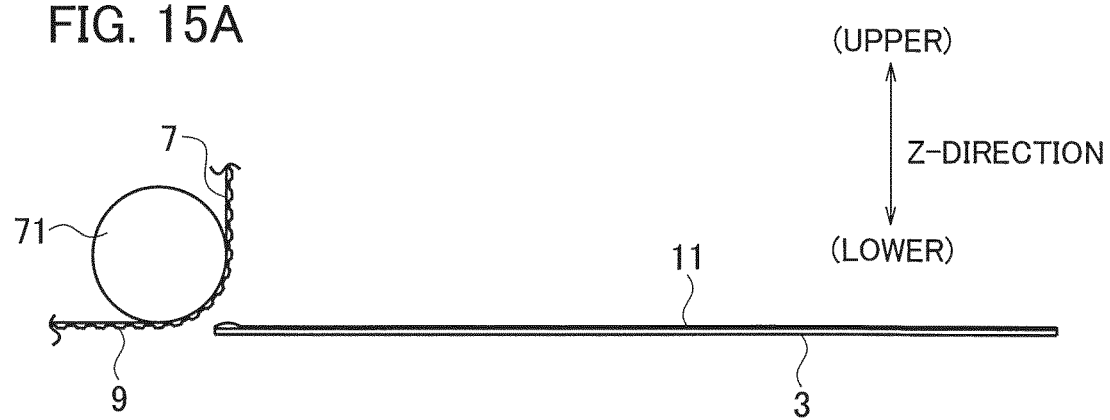
FIGS. 15A, 15B, and 15C are views illustrating the operation of moving a presser roller of the transfer apparatus according to the embodiment and pressing a mold against a substrate.
Figure 15B:
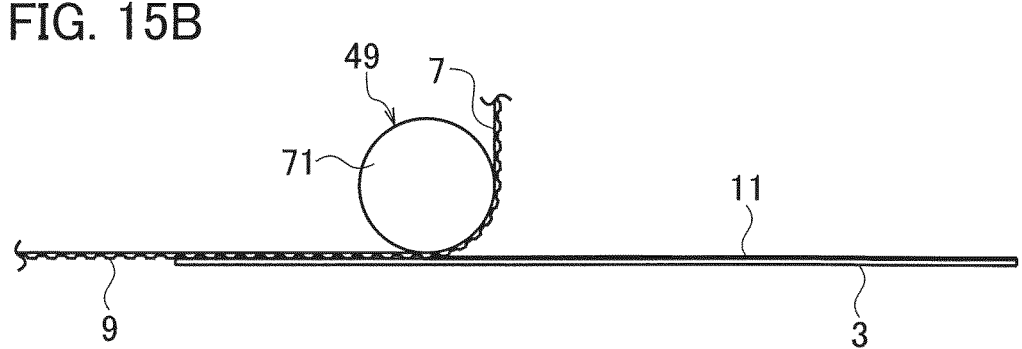
Figure 15C:
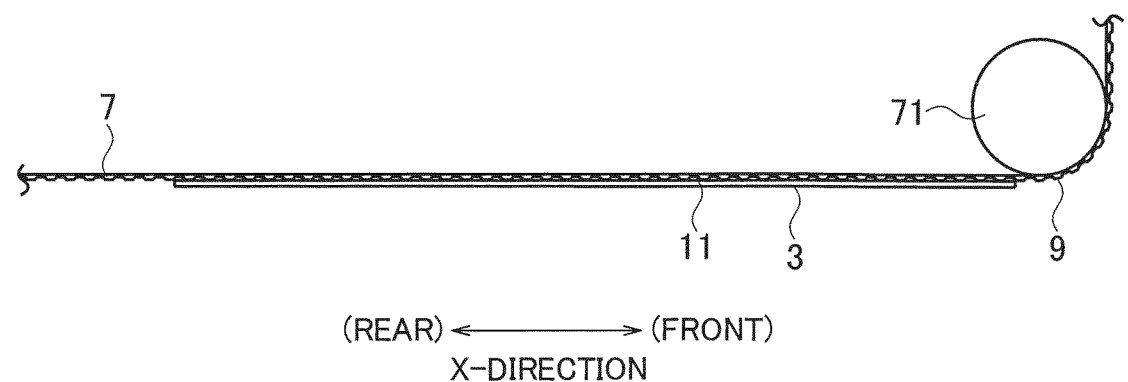

With the movement of the presser roller 71 from the pressing start position to the pressing end position, by the substrate 3 placed on the substrate installation body 65 and the presser roller 71, the portion of the mold 7 pressed against the substrate 3 (a portion mold 7 to be pressed against the ultraviolet curable resin 11 of the substrate 3, in the form of a flat plate) spreads from the rear toward the front (see FIG. 15A to 15C and the like).

When the presser roller 71 has finished moving to the pressing end position, the flat substrate 3 and the flat mold 7 are opposed to each other through the ultraviolet curable resin 11 (see FIG. 3B).

Conversely, the movement of the presser roller 71 from the pressing end position to the pressing start position causes the mold 7 to be peeled from the substrate 3 installed on the substrate installation body 65.

The substrate/mold positioning unit 63 includes a substrate-installation-body positioning unit 79, a first camera 81 for capturing the substrate 3 installed on the substrate installation body 65, and a second camera 83 for capturing the mold 7 installed in the mold installation unit 47.

The first camera 81 and the second camera 83 are provided integrally with the base body 43. The second camera 83 takes a picture of a portion mold 7 in the form of a flat plate between the mold rolled web 25 and the winding roller 27, for example, a portion of the mold 7 positioned between the second guide roller 73B and the presser roller 71.

The first camera 81 takes an image of an alignment mark (not illustrated) provided on the substrate 3. By this image, the control unit 57 detects the position of the substrate (i.e. the substrate placed on the substrate installation body 65) 3 with respect to the base body 43.

Instead of or in addition to the alignment mark, the end face of the substrate 3 or the like may be taken to detect the position of the substrate 3 with respect to the base body 43. When taking the image of an alignment mark, it is desirable that the ultraviolet curable resin 11 is not provided about the alignment mark.

The second camera 83 takes an image of an alignment mark (not illustrated) provided on the mold 7. By this image, the control unit 57 detects the position of the mold 7 with respect to the base body 43. Instead of or in addition to the alignment mark, the end face or the like of the transfer pattern 9 on the mold 7 may be taken to detect the position of the mold 7 with respect to the base body 43.

The substrate-installation-body positioning unit 79 positions the substrate installation body 65 with respect to the base body 43 in both the X-direction and the Y-direction and around the C-axis.

The substrate installation body 65 is supported on the base body 43 so as to be movable in the X-direction, the Y-direction, and around the C-axis, and also positioned in movement by an actuator (not illustrated) such as a servo motor.

Then, the substrate/mold positioning unit 63 positions the substrate 3 with respect to the mold 7 under control of the control unit 57 using the images captured by the first camera 81 and the second camera 83.

The mask-unit installation unit 51 includes a mask-unit mount body 85 having a flat upper surface and a mask-unit holder 87 having a flat lower surface.

Only when the mask unit 13 is brought into contact with the upper surface of the mask-unit mount body 85 through the lower surface, and further positioned with respect to the mask-unit mount 85 to some extent, the mask unit 13 is mounted on the mask-unit mount 85.

The mask-unit holder 87 is supported on a mask-unit support 89 via guide rods 91 and the like. The mask-unit holder 87 is moved and positioned with respect to the mask-unit support 89 in the Z-direction by an actuator (not illustrated) such as a cylinder.

By vacuum suction, for example, the mask-unit holder 87 holds the mask unit 13 so that the upper surface of the mask unit 13 abuts on the lower surface of the mask-unit holder 87.

In a state where the mask unit 13 is mounted on the mask-unit mount 85 (see FIG. 6), the mask-unit holder 87 is lowered to hold the mask unit 13. When the mask-unit holder 87 is elevated while holding the mask unit 13, it is separated from the mask-unit mount 85 (see FIG. 11).

In order that ultraviolet rays emitted by the irradiation unit 55 are transmitted through the ultraviolet transmitting part 93 and the ultraviolet transmitting part 15 of the mask unit 13 and the mold 7 to reach the ultraviolet curable resin 11 of the substrate 3, a part of the mask-unit holder 87 constitutes an electromagnetic-wave transmitting part (ultraviolet transmitting part) 93 made of glass or the like.

The mask-unit positioning unit 53 includes the mask-unit support 89, the mask-unit conveying body 95, and the third camera 97.

The third camera 97 is provided integrally with the base body 43 to capture the mask unit 13 held by the mask-unit holder 87.

The third camera 97 takes an image of an alignment mark (not illustrated) provided on the mask unit 13. By this image, the control unit 57 detects the position of the mask unit 13 with respect to the base body 43 (the using position: a position under the condition illustrated in FIGS. 12 and 13 in the X-direction, the Y-direction and around the C-axis). Instead of or in addition to the alignment mark, the end face of the mask unit 13 may be taken to detect the position of the mask unit 13 with respect to the base body 43.

The mask-unit conveying body 95 is supported on the base body 43 so as to be movable between its withdrawal position (a position illustrated with FIG. 6) and the using position (a position illustrated with FIGS. 12 and 13) in the X-direction. The mask-unit conveying body 95 is moved and positioned by an actuator (not illustrated) such as a linear motor.

The mask-unit support 89 is positioned with respect to the mask-unit conveying body 95. The mask-unit support 89 is supported by the mask-unit conveying body 95 so as to be movable in the X-direction, the Y-direction, and around the C-axis. The mask-unit support 89 is moved and positioned by an actuator (not illustrated) such as a linear motor.

Using the image captured by the first camera 81, the second camera 83, or the third camera 97, the mask-unit positioning unit 53 positions the mask-unit holder 87 with respect to the mask-unit conveying body 95 under the control of the control unit 57. Thus, the positioning of the mask unit 13 with respect to the substrate 3 and the mold 7 is performed.

Figure 12:
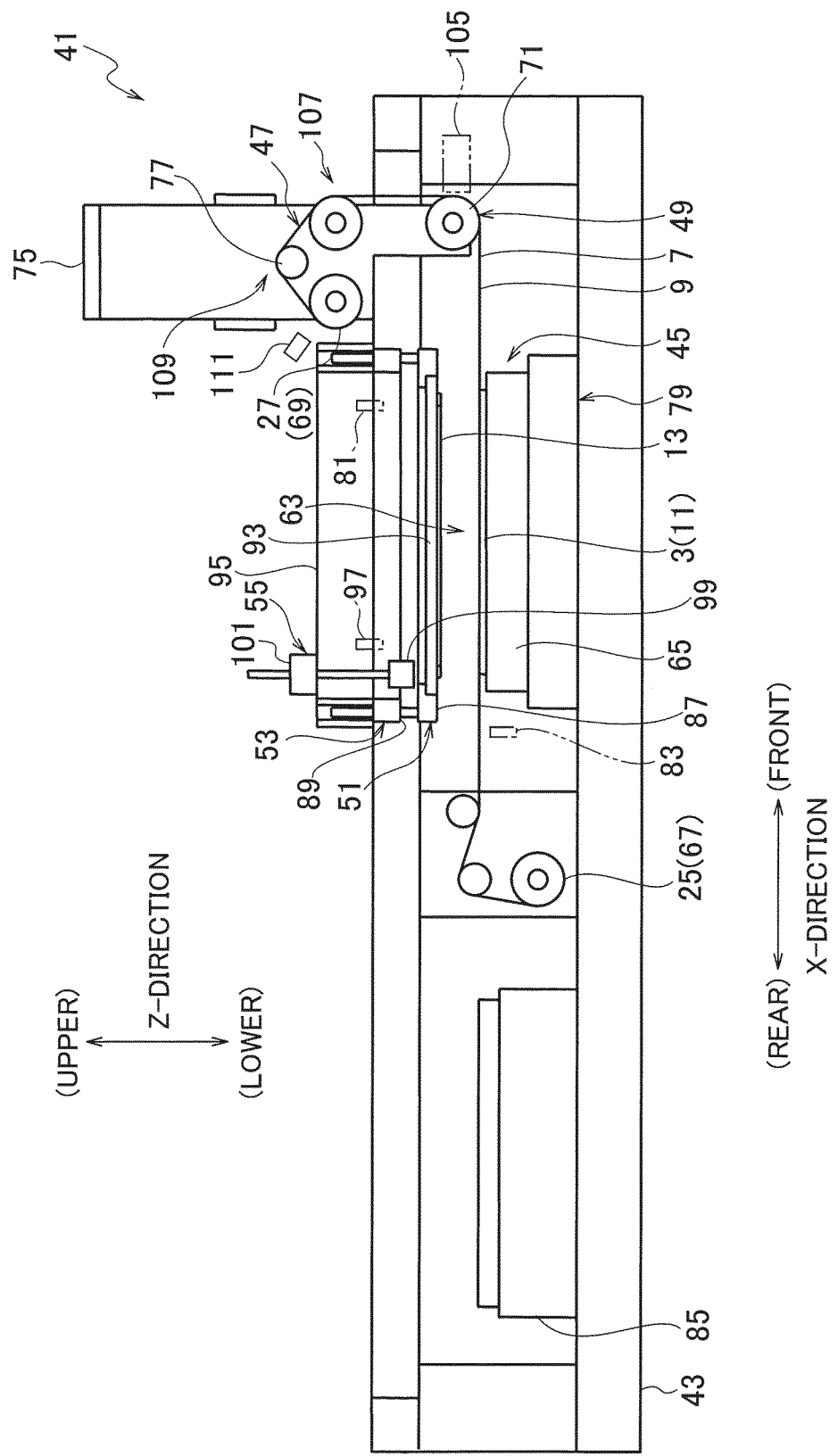
FIG. 12 is a view illustrating the operation of the transfer apparatus according to the embodiment.
Figure 13:
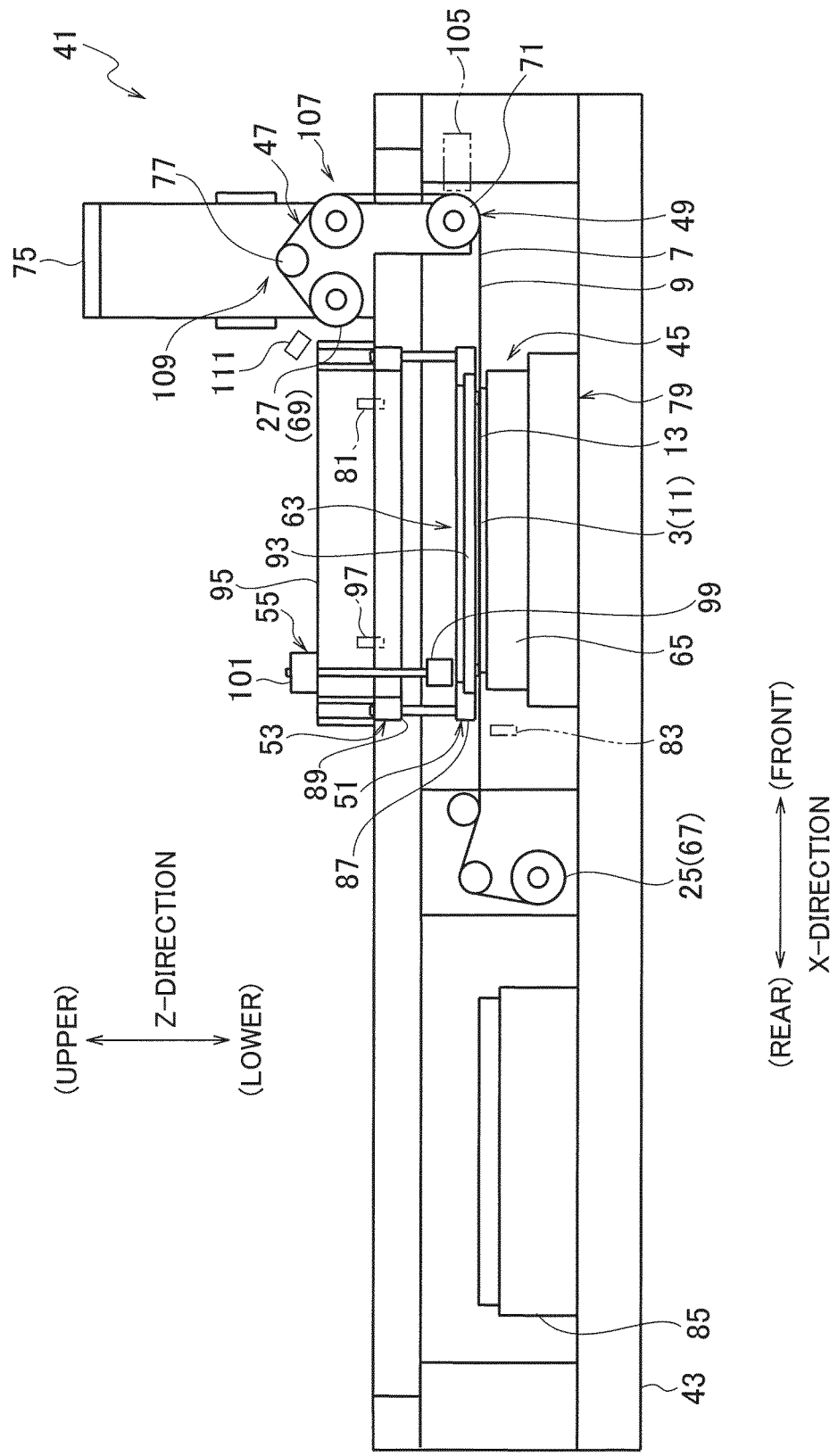
FIG. 13 is a view illustrating the operation of the transfer apparatus according to the embodiment.

When positioning the mask-unit holder 87 with respect to the mask-unit conveying body 95, that is, when positioning the mask unit 13 with respect to the substrate 3 or the mold 7, the mask-unit conveying body 95 is positioned in the using position illustrated with FIGS. 12 and 13, and the mask-unit conveying body 95, the mask-unit holder 87, and the mask unit 13 are positioned substantially directly above the substrate 3 mounted on the substrate installation body 65.

The irradiation unit 55 includes an ultraviolet-ray generator 99 and an ultraviolet-ray generator support 101. The ultraviolet-ray generator 99 is supported by the ultraviolet-ray generator support 101 via guide rods 103 and the like. With driving of an actuator (not illustrated) such as a cylinder, the ultraviolet-ray generator 99 is movable to the ultraviolet-ray generator support 101 in the Z-direction.

Figure 14:
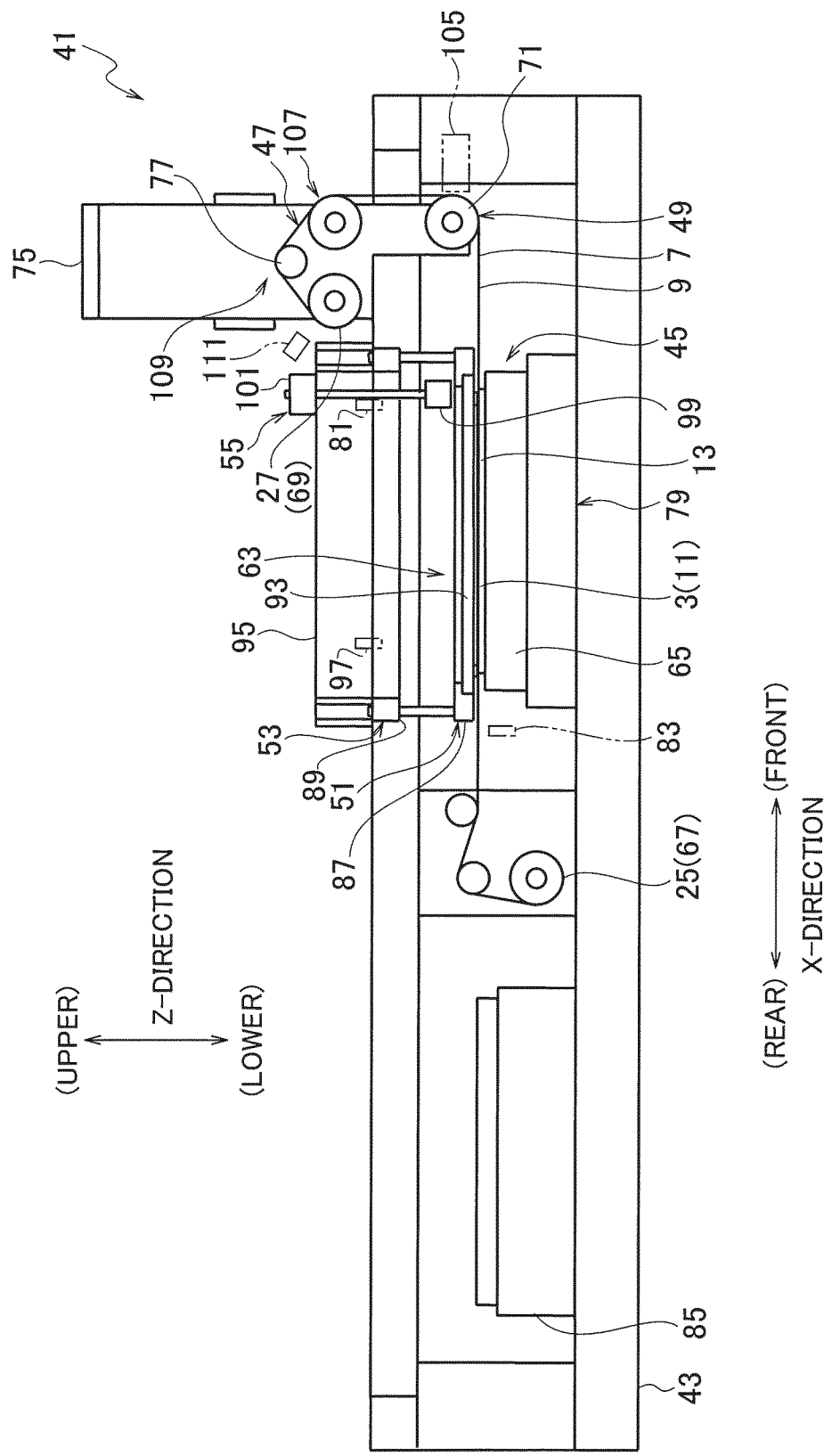
FIG. 14 is a view illustrating the operation of the transfer apparatus according to the embodiment.

In the movement of the ultraviolet-ray generator 99 in the Z-direction, the irradiation unit 55 is designed so that the ultraviolet-ray generator 99 is located at either the upper position (the positions illustrated with FIGS. 6, 11 and 12) or the lower position (the positions illustrated with FIGS. 13 and 14).

The ultraviolet-ray generator support 101 is supported by the mask-unit conveying body 95 so as to be movable in the X-direction. With driving of an actuator (not illustrated) such as a linear motor, the ultraviolet-ray generator support 101 is movable to the mask-unit conveying body 95.

As a result, the ultraviolet-ray generator support 101 and the ultraviolet-ray generator 99 move between the rear position (the position illustrated with FIG. 13) and the front position (the position illustrated with FIG. 14) at a predetermined speed.

Next, the operation of the transfer apparatus 41 will be described.

In an initial state, as illustrated in FIG. 6, there is a situation where: the mask unit 13 is mounted on the mask-unit mount 85; the mask-unit support 89 is elevated; the mask-unit conveying body 95 is positioned at the withdrawal position; the ultraviolet-ray generator 99 is positioned at the upper position; the ultraviolet-ray generator support 101 is positioned at the rear position; the presser roller 71 is positioned at the pressing start position; and the substrate 3 provided with the uncured ultraviolet curable resin 11 is mounted on the substrate installation body 65A.

In this initial state, the substrate/mold positioning unit 63 positions the substrate 3 with respect to the mold 7, and additionally, the mask-unit holder 87 is lowered to hold the mask unit 13 and then elevated.

Subsequently, by the mold presser unit 49, the presser roller 71 is moved from the pressing start position up to the pressing end position, thereby pressing the mold 7 formed with a predetermined transfer pattern 9 against the substrate 3 installed with the ultraviolet curable resin 11 (see FIG. 11).

Subsequently, with the mold 7 pressed against the substrate 3, the mask-unit conveying body 95 is positioned at the using position, and the mask-unit support 89 (the mask unit 13) is positioned with respect to the substrate 3 and the mold 7 by the mask-unit positioning unit 53 (See FIG. 12).

Next, the mask-unit holder 87 is lowered until the mask unit 13 abuts on the mold 7 (see FIG. 13).

In connection, the transfer apparatus 41 may be configured so as to: under condition of pressing the mold 7 against the substrate 3 lower the mask-unit holder 87 until the mask unit 13 is located at a position slightly away from the mold 7; perform the positioning by the mask-unit positioning unit 53 in this state; and after this positioning, further lower the mask-unit holder 87 so that the mask unit 13 abuts on the mold 7.

Subsequently, it is performed to: lower the ultraviolet-ray generator 99 (see FIG. 13); allow the ultraviolet ray generator 99 to generate the ultraviolet rays; move the ultraviolet-ray generator support 101 from the rear position to the front position; and irradiate the ultraviolet rays to the ultraviolet curable resin 11 on the substrate 3 through the ultraviolet transmitting part 93 of the mask unit holder 87, the ultraviolet transmitting part 15 of the mask unit 13, and the mold 7 (FIG. 14).

Thereafter, it is performed to: elevate the ultraviolet-ray generator 99; move the ultraviolet-ray generator support 101 from the front position to the rear position; and elevate the mask-unit holder 87 so that the mask-unit conveying body 95 is positioned at the withdrawal position.

In succession, the mold 7 is peeled off from the substrate 3 by moving the presser roller 71 from the pressing end position to the pressing start position. Consequently, the product 1 onto which the transfer pattern 9 of the mold 7 is transferred is provided.

Thereafter, with use of a carrying-in/carrying-out device (not illustrated) such as a robot, the product 1 is replaced with another substrate 3, and the next transfer is made to this substrate 3.

According to the transfer apparatus 41, it is performed to position the mask unit 13 having the ultraviolet transmitting part 15 formed thereon, with respect to the substrate 3 and the mold 7 on condition of pressing the mold 7 against the substrate 3. For this reason, it is possible to ensure the accurate position of the transfer pattern (i.e. the protrusion 5 of a predetermined shape) transferred onto the ultraviolet curable resin 11 with respect to the substrate 3, as illustrated in FIG. 2A.

That is, it is possible to avoid the occurrence of such a phenomenon as illustrated in FIGS. 2B, 2C, and 2D, where the position of the protrusion 5 with respect to the substrate 3 is not deviated from the designed position.

According to the transfer apparatus 41, additionally, in a state where the mask unit 13 has been located in position, the ultraviolet transmitting part 15 of the mask unit 13 is located inside a portion of the mold 7 formed with the transfer pattern 9. Thus, the transfer pattern 9 of the mold 7 is pressed against all portions of the ultraviolet curable resin 11 of the substrate 3 to be irradiated with ultraviolet rays through the ultraviolet transmitting part 15 of the mask unit 13. Consequently, even if the mask unit 13 slightly moves with respect to the substrate 3 or the mold 7 when the mask unit 13 having the ultraviolet ray transmitting part 15 formed thereon is positioned with respect to the substrate 3 or the mold 7, the transfer pattern 9 of the mold 7 can be transferred onto all portions of the ultraviolet curable resin 11 of the substrate 3 to be irradiated with ultraviolet rays through the ultraviolet transmitting part 15 of the mask unit 13.

Further, according to the transfer apparatus 41, the positioning of the substrate 3 with respect to the mold 7 is performed before pressing the mold 7 against the substrate 3. Therefore, it is possible to make the position of the transfer pattern (the protrusion 5 of a predetermined shape) transferred to the ultraviolet curable resin 11, with respect to the substrate 3 more accurate.

In the transfer apparatus 41, additionally, if making the shape of the ultraviolet transmitting part 15 of the mask unit 13 coincident with the shape of the transfer pattern 9 of the mold 7 and also performing the positioning of the mask unit 13 so as to align the position of the ultraviolet transmitting part 15 of the mask unit 13 with the position of the transfer pattern 9 of the mold 7, then it is possible to transfer the transfer pattern 9 of the mold 7 onto the ultraviolet curable resin 11 without producing the residual film parts 21, as described with FIGS. 17 and 18.

Besides, in order to perform the transfer as illustrated in FIGS. 19 and 20, the transfer apparatus 41 may be configured so that the substrate 3 installed in the substrate installation unit 45 can be moved and positioned with respect to the mold 7 installed in the mold installation unit 47 and the base body 43 in the Y-direction and the X-direction.

Then, in a state where: the substrate 3 is installed in the substrate installation unit 45; the mold 7 is installed in the mold installation unit 47; and the mask unit 13 is installed in the mask-unit installation unit 51, the control unit 57 may control the operations of the mold presser unit 49, the mask-unit positioning unit 53, the irradiation unit 55, and the substrate installation unit 45, as described below.

Then, by repeating the operations of: pressing the mold 7 against the substrate 3 by the mold presser unit 49; positioning the mask unit 13 with respect to the substrate 3 and the mold 7 by the mask-unit positioning unit 53; and subsequently irradiating the ultraviolet rays against the ultraviolet curable resin 11 of the substrate 3 placed on the substrate installation unit 45 by the irradiation unit 55 while changing the position of the substrate 3 with respect to the mold 7 and the base body 43 multiple times, the transfer pattern is transferred to the ultraviolet curable resin 11 provided on the substrate 3.

As a result, as illustrated in FIGS. 19 and 20, by transferring a plurality of times on one large substrate 3, it is possible to provide it with a plurality of transfer patterns (the protrusions 5 of a predetermined shape), allowing the transfer operation to the ultraviolet curable resin 11 of the substrate 3 to be performed efficiently. Further, by properly dividing the substrates 3 illustrated in FIGS. 19 and 20, it is possible to produce the product 1 illustrated in FIG. 1 and the like.

In addition, as illustrated in FIG. 6, the transferring apparatus 41 may be provided with a collecting unit (collecting device) 105. The collecting device 105 is adapted so as to collect the uncured ultraviolet curable resin adhering to the mold 7 (i.e. ultraviolet curable resin which has not been irradiated with ultraviolet rays and which has not been uncured due to the presence of the mask unit 13), for example, by vacuum suction when moving the presser roller 71 to peel off the mold 7 from the substrate 3 after performing the transfer.

Besides, the collecting device 105 is provided integrally with the presser roller support 75 and also adapted so as to move together with the presser roller 71 in the X-direction.

The transfer apparatus 41 will be described furthermore.

As described above, the transfer apparatus 41 is configured to transfer the transfer pattern 9 to the ultraviolet curable resin 11 of the substrate 3 by: developing a portion of the long sheet-like mold 7 formed with the predetermined transfer pattern 9 into a flat plate shape; and subsequently pressing the resulting portion of the mold developed into a flat plate shape against the flat-shaped substrate 3 provided with a material (for example, ultraviolet curable resin) 11 in the form of a thin film. The transfer apparatus 41 includes the dancer roller 77 and the presser roller 71.

The mold 7 extending in the longitudinal direction is wound around the presser roller 71. The presser roller 71 around which the mold 7 is wound is movable to the base body 43 between the pressing start position and the pressing end position.

The dancer roller 77 is provided, for example, above the presser roller 71 and on the presser roller support 75. The dancer roller 77 is turnable (rotatable) around a center axis extending in the Y-direction of the dancer roller 77, with respect to the presser-roller support 75.

The mold 7 that extends between the mold rolled web 25 installed in the mold-web installation unit 67 and the winding roller 27 of the winding-roller installation unit 69 is wound around the dancer roller 77.

Between a separate position distant from the substrate 3 (i.e. the upper position illustrated in FIG. 6) and a substrate-side position that is a position of side of the substrate 3 (i.e. the lower position illustrated in FIG. 11), the dancer roller 77 is movable to the presser-roller support 75 in the Z-direction.

The transfer apparatus 41 is also provided with a dancer-roller driving unit 109 and a presser-roller driving unit 107. The presser-roller drive unit 107 moves the presser roller 71 (the presser-roller support 75) between the pressing start position and the pressing end position.

When the presser roller 71 moves from the pressing start position to the pressing end position under the condition that the mold 7 is wound around the presser roller 71, a portion of the sheet-like mold 7 in the form of a flat plate, which abuts on the substrate 3, spreads from one end (rear end) toward the other end (front end) of the substrate 3 gradually (see FIG. 15).

When the presser roller 71 is located at the pressing start position, the mold 7 is not pressed against the substrate 3. On the other hand, when the presser roller 71 has moved up to the pressing end position, the mold 7 is pressed against the substrate 3, for example, its entire surface.

As the presser roller 71 turns on its axis when moving between the pressing start position and the pressing end position, no slippage is produced between the mold 7 and the presser roller 71. In order to prevent an occurrence of slippage between the mold 7 and the presser roller 71 when moving between the pressing start position and the pressing end position, the presser roller 71 may be rotated in synchronization with this movement by an actuator (not illustrated) forcibly.

With use of an actuator (not illustrated) such as a linear motor, the dancer-roller driving unit 109 moves the dancer roller 77 between the substrate-side position and the separate position.

As the dancer roller 77 turns on its axis when moving between the substrate-side position and the separate position, no slippage is produced between the mold 7 and the dancer roller 77. In order to prevent an occurrence of slippage between the mold 7 and the dancer roller 77 when moving between the substrate-side position and the separate position, the presser roller 71 may be rotated in synchronization with this movement by an actuator (not illustrated) forcibly.

In order to press the mold 7, the control unit 57 moves the presser roller 71 from the pressing start position to the pressing end position. Further, when the presser roller 71 moves to press the mold 7, the control unit 57 controls the presser-roller driving unit 107 and the dancer-roller driving unit 109 so that the dancer roller 77 moves from the separate position to the substrate-side position while preventing the mold 7 from slackening.

Providing that the dancer roller 77 is previously urged upward by an elastic body (e.g. a spring), there may be adopted an operation of the dancer roller driving unit 109 to allow the dancer roller 77 to move downward with a tension of the mold 7, which would be generated by the movement of the presser roller 71.

The control unit 57 controls the presser-roller driving unit 107 and the dancer-roller driving unit 109 as follows.

In order to peel the mold 7, which has been pressed against the substrate 3, from the substrate 3 after moving the presser roller 71 from the pressing start position to the pressing end position to cure the ultraviolet curable resin 11, the control unit 57 controls to move the presser roller 71 from the pressing end position up to the pressing start position. Further, while the presser roller 71 is moving for peeling the mold 7, the control unit 57 controls to move the dancer roller 77 from the substrate-side position to the separate portion while preventing the mold 7 from slackening.

The movement of the presser roller 71 and the dancer roller 77 for pressing the mold 7 and the movement of the presser roller 71 and the dancer roller 77 for peeling the mold 7 from the substrate 3 are alternately repeated a plurality of times.

The transfer apparatus 41 is provided with another ultraviolet irradiation unit 111 separate from the irradiation unit 55. Then, under the control of the control unit 57, after performing the movement of the presser roller 71 and the dancer roller 77 for pressing the mold 7 and the movement of the presser roller 71 and the dancer roller 77 for peeling the mold 7 alternately a plurality of times, the ultraviolet irradiation unit 111 irradiates the ultraviolet rays to the remaining ultraviolet curable resin 11 in order to prevent the ultraviolet curable resin remaining in the mold 7 (i.e. the ultraviolet curable resin moved from the substrate 3) from sagging.

The ultraviolet irradiation unit 111 is provided integrally with the presser roller support 75 and moves together with the presser roller support 75. The ultraviolet irradiation unit 111 irradiates ultraviolet rays to a portion of the mold 7 immediately before being taken up by the winding roller 27 of the winding-roller installation unit 69.

Next, the operation of the transfer apparatus 41 will be explained supplementarily.

As illustrated in FIG. 6, when the pressing of the mold 7 against the substrate 3 is started by the mold presser unit 49, the presser roller 71 is positioned at the pressing start position, while the dancer roller 77 is positioned at the separate position. Additionally, the mold rolled web 25 placed on the mold-web installation unit 67 is prevented from rotating, for example, by an application of a brake, and the winding roller 27 of the winding-roller installation unit 69 is also prevented from rotating, for example, by an application of a brake.

Even under the condition that the mold 7 is pressed against the substrate 3 by the mold presser unit 49, the mold rolled web 25 and the winding roller 27 are prevented from rotating. That is, the length of the mold 7 between the mold fabric 25 and the take-up roller 27 is constant.

Further, in the half-way condition that the mold 7 is pressed against the substrate 3 by the mold presser unit 49, the presser roller 71 moves from the pressing start position to the pressing end position at a predetermined speed. Additionally, the dancer roller 77 moves downward (moves from the separate position toward the substrate-side position at a predetermined speed) in order to compensate for the length of the mold 7 by supplying the mold 7 to the presser roller 71 side while preventing an occurrence of a slack of the mold 7 between the mold rolled web 25 and the winding roller 27.

Figure 11:
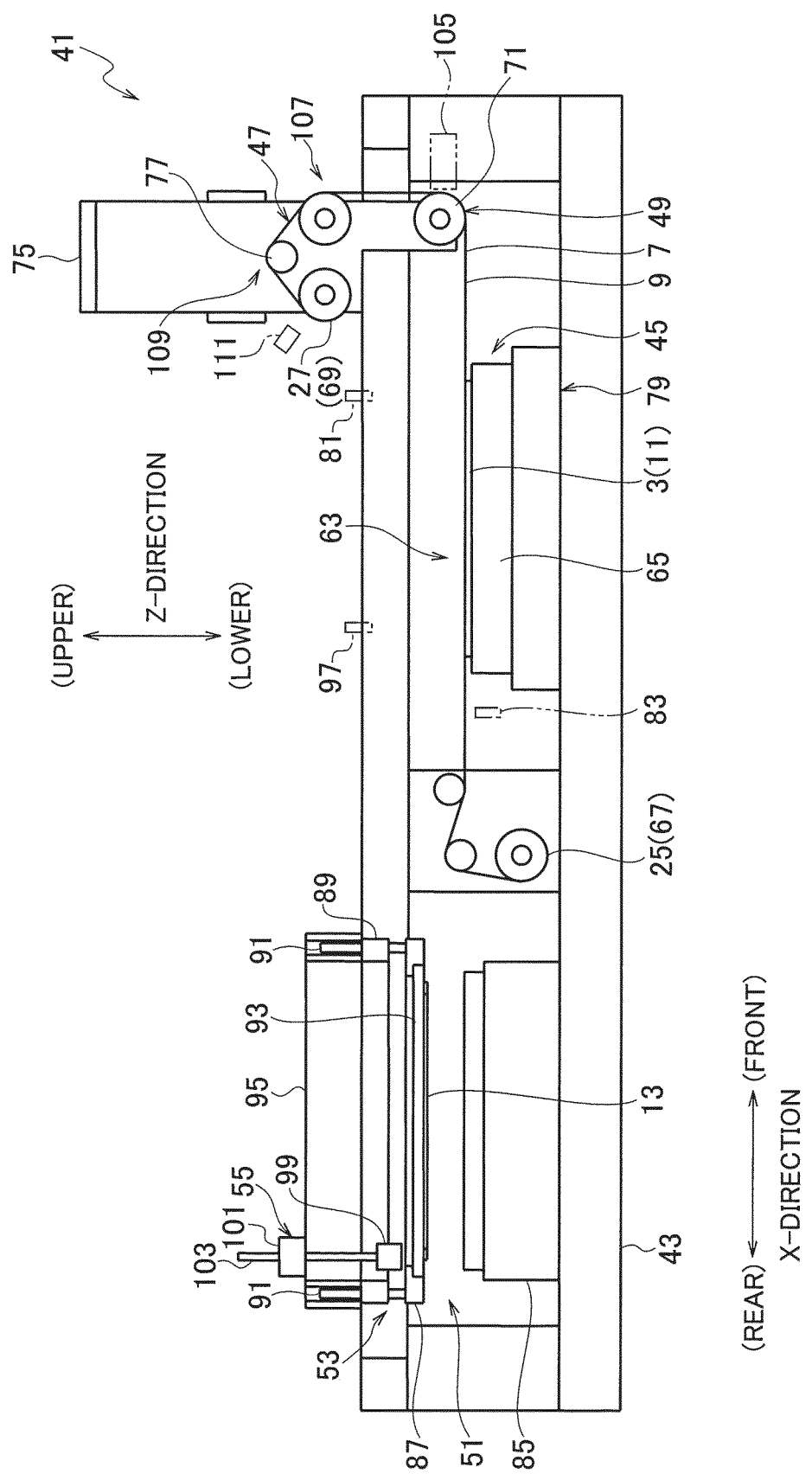
FIG. 11 is a view illustrating the operation of the transfer apparatus according to the embodiment.

When the pressing of the mold 7 against the substrate 3 is completed by the mold presser unit 49, the dancer roller 77 is positioned at the substrate-side position (see FIGS. 11 and 14).

From the state illustrated in FIGS. 11 and 14, when separating the mold 7 from the substrate 3, the presser roller 71 moves from the pressing end position toward the pressing start position at a predetermined speed, and the dancer roller 77 is elevated so as not to produce a slack in the mold 7 between the mold rolled web 25 and the winding roller 27.

By repeating such operations a predetermined number of times while preventing the mold rolled web 25 and the winding roller 27 from rotating, the transferring operation of a transfer pattern onto a plurality of substrates 3 (the ultraviolet curable resins 11) is carried out.

After transferring the transfer pattern 9 to a plurality of substrates 3 (the ultraviolet curable resins 11) (after transferring one substrate 3 a plurality of times in the embodiment illustrated in FIGS. 19 and 20), it is performed to rotate the winding roller 27 of the winding-roller installation unit 69 by an actuator (not illustrated), such as a servo motor, thereby winding up the mold 7 by a predetermined length by the winding roller 27 while preventing an occurrence of a slack in the mold 7 between the mold rolled web 25 and the winding roller 27.

By this winding, a new portion of the mold 7 is unwound from the mold rolled web 25, and the transfer operation of a new transfer pattern 9 to the substrate 3 (ultraviolet curable resin 11) is carried out a plurality of times in the same way.

According to the transfer apparatus 41 which operates in this manner, it is possible to utilize one transfer pattern 9 of the mold 7 for the transfer operation a plurality of times, thereby allowing a use amount of the mold 7 to be reduced. In other words, as the transfer pattern 9 formed at a part of the mold 7 can be used for transferring a plurality of times, it is possible to reduce a use amount of the mold 7.

Further, according to the transfer apparatus 41, since it is configured so that, after repeating the movements of the presser roller 71 and the dancer roller 77 for pressing and the movements of the presser roller 71 and the dancer roller 77 for peeling a plurality of times alternately, the ultraviolet rays are irradiated by the ultraviolet-ray generator 99 to cure the uncured ultraviolet curable resin remaining in the mold 7, it is prevented that the uncured ultraviolet curable resin drips from the mold 7 wound around the winding roller 27.

In the transfer apparatus 41 where the single transfer pattern 9 of the mold 7 is used for a plurality of transfer operations, it may be performed to transfer the transfer pattern 9 of the mold 7 to the substrate 3 itself without providing a material such as ultraviolet curable resin on the substrate 3. Namely, providing that the substrate 3 is made of e.g. thermoplastic resin or the like, the transfer operation may be performed by directly pressing the mold 7 against the substrate 3 having a high temperature and plasticity. Alternatively, there may be adopted thermoplastic resin as the material to be provided on the substrate 3. In such a case, the mask unit 13 and the irradiation step of ultraviolet rays would become unnecessary.

Figure 21A:
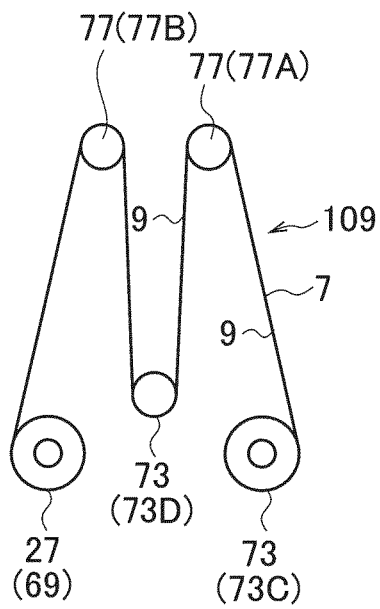
FIGS. 21A and 21B are views illustrating modifications of dancer rollers of the transfer apparatus according to the embodiment.
Figure 21B:
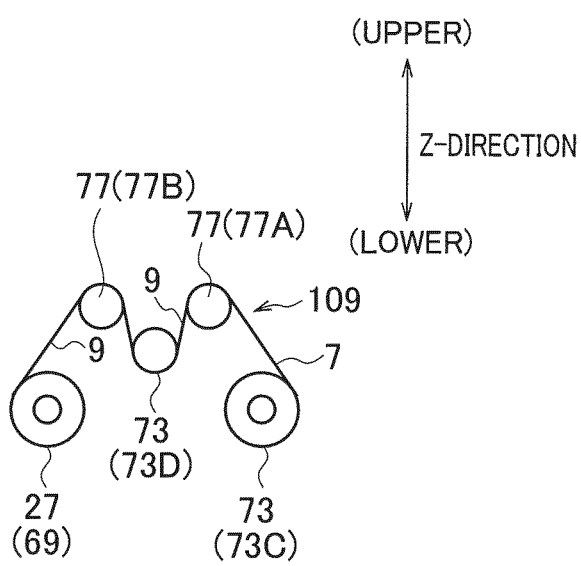

As illustrated in FIGS. 21A and 21B, the transfer apparatus 41 may be provided with two or more dancer rollers 77. FIG. 21A illustrates two dancer rollers 77 (77A, 77B) in respective separate positions, while FIG. 21B illustrates the two dancer rollers 77 (77A, 77B) in respective substrate-side positions.

The mold 7 delivered from the mold rolled web 25 is wound around the presser roller 71 and the like. Thereafter, the mold 7 is wound around the third guide roller 73C, the first dancer roller 77A, the fourth guide roller 73D, and the second dancer roller 77B in this order and finally wound up by the winding roller 27.

Although the first dancer roller 77A and the second dancer roller 77B are adapted so as to move simultaneously, they may be configured so as to move independently of each other.

According to the transfer apparatus 41 including the plurality of dancer rollers 77 (77A, 77B), it is possible to reduce the moving amount of the dancer roller 77 in comparison with the case of providing only one dancer roller 77, thereby allowing the apparatus to be miniaturized.

Figure 22:
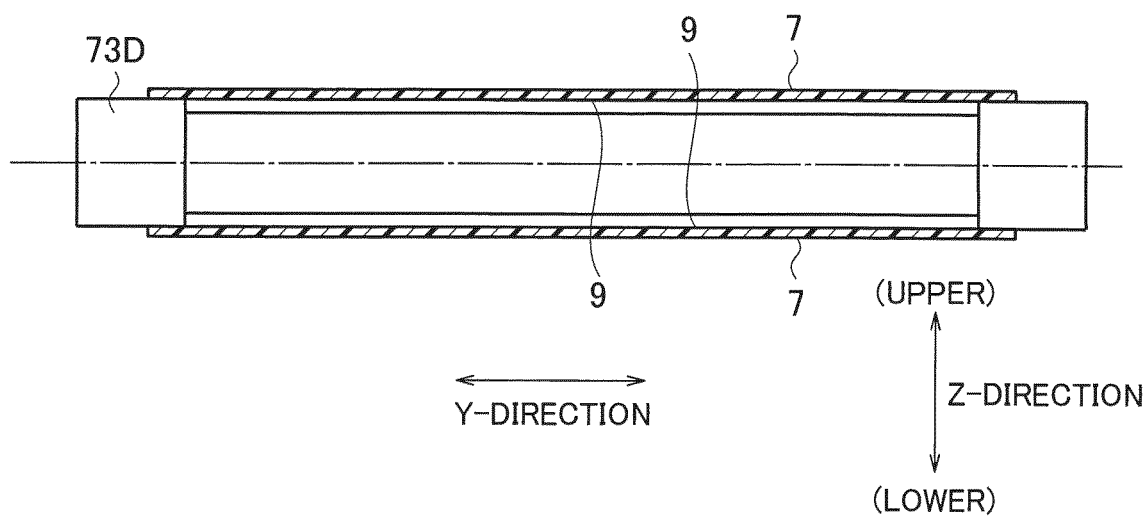
FIG. 22 is a view illustrating a modification of rollers of the transfer apparatus according to the embodiment.

As illustrated in FIGS. 21A and 21B, in the mold 7 wound around the fourth guide roller 73D positioned between the first dancer roller 77A and the second dancer roller 77B, a surface of the mold 7 provided with the transfer pattern 9 abuts on the fourth guide roller 73D. Therefore, by reducing the diameter of the fourth guide roller 73D at its central portion (a portion of roller excluding both end portions) in the extending direction of the center axis of the fourth guide roller 73D in the form of a column, the mold 7 may be configured as not to abut on the central part of the fourth guide roller 73D, as illustrated in FIG. 22. In connection, the transfer pattern 9 may be provided at a portion of the mold 7 in non-contact with the center part of the fourth guide roller 73D.

Further, the other guide rollers 73A, 73B, and 73C may be configured similarly to the fourth guide roller 73D.

Meanwhile, the features of the transfer apparatus 41 where the dancer rollers 77 operate in the above-mentioned way may be grasped as the features of the transfer method described below.

In the transfer method of the present application, by: developing a part of a long sheet-like mold 7 having a predetermined transfer pattern 9 formed on one surface of the mold 7 in the thickness direction, into a flat plate shape; and further pressing the mold 7 against a flat-plate shaped substrate 3 or a substrate 3 provided with a material 11 on one surface of the substrate 3 in the thickness direction, the transfer pattern 9 is transferred onto the substrate 3 or the material 11. The transfer method includes a mold pressing step, a first dancer-roller moving step, a curing step, a mold peeling step, and a second dancer-roller moving step.

In the mold pressing step, the mold 7 is pressed against the substrate 3 by moving a presser roller 71 around which the mold 7 is wound, from a pressing start position to a pressing end position.

In the first dancer-roller moving step, while preventing the mold 7 from loosening during pressing in the mold pressing step, the dancer roller 77 around which the mold 7 is wound, is moved from a separate position away from the substrate 3 to a substrate-side position on the side of the substrate 3.

In the curing step, the substrate 3 or the material 11 of the substrate 3 is cured while that the mold 7 is being pressed against the substrate 3 in the mold pressing step.

In the mold peeling step, after performing to press the mold 7 in the mold pressing step and the dancer-roller moving step, the presser roller 71 is moved from the pressing end position to the pressing start position to peel the mold 7, which has been pressed against the substrate 3, from the substrate 3.

In the second dancer-roller moving step, while preventing the mold 7 from loosening when peeled the mold 7 in the mold peeling step, the dancer roller 77 is moved from the substrate-side position on the side of the substrate 3 to the separate position.

In the transfer method of the present application, additionally, by repeating the substrate installation step, the mold pressing step, the first dancer-roller moving step, the mold peeling step, and the second dancer-roller moving step in this order a plurality of times, the transfer pattern 9 may be transferred on a plurality of substrates 3 or the material 11 provided on the substrates 3, one by one.

In the case where the material 11 of the substrate 3 is a material (for example, ultraviolet curable resin) 11 which is cured by irradiation with electromagnetic waves of a predetermined wavelength (for example, ultraviolet rays), the transfer method of the present application may include a residual-material electromagnetic-wave irradiation step to irradiate electromagnetic waves of a predetermined wavelength to the material 11 remaining in the mold 7, after repeating the substrate installation step, the mold pressing step, the first dancer-roller moving step, the mold peeling step, and the second dancer-roller moving step in this order a plurality of times.

Figure 23A:
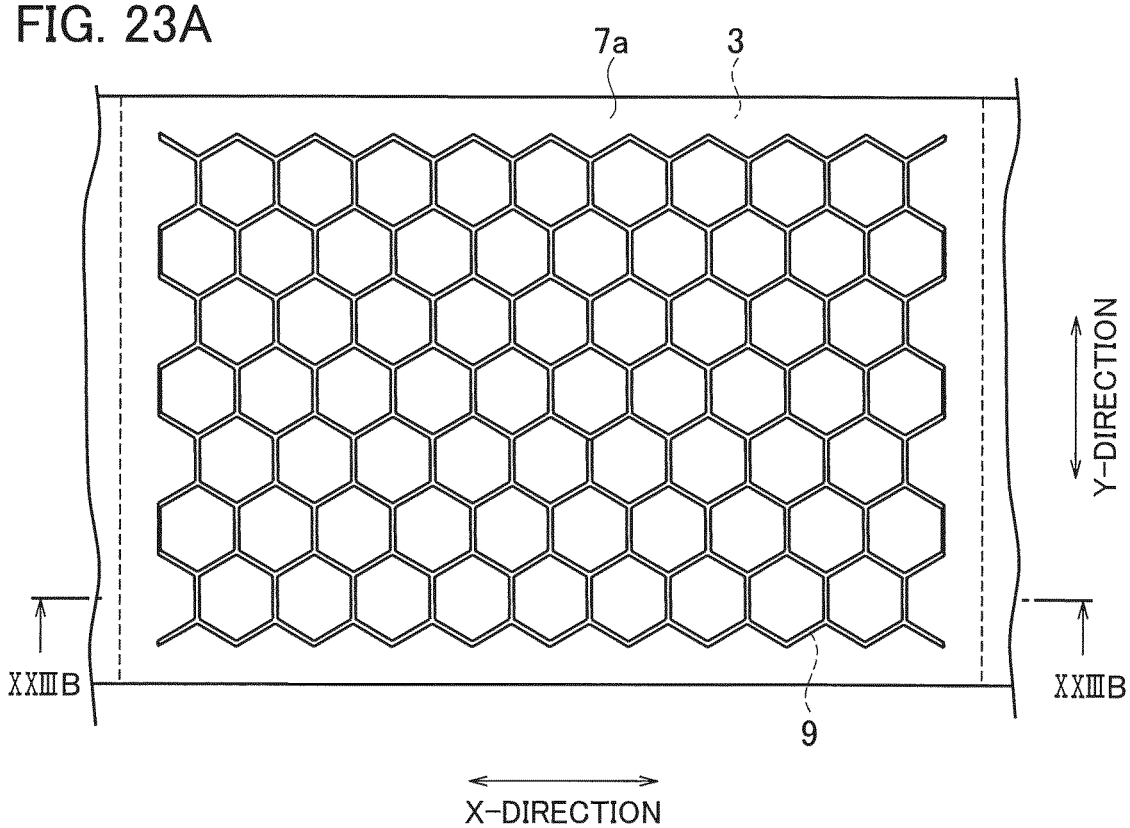
FIG. 23A is a view illustrating a transfer method where a mask unit is provided on a mold, corresponding to FIG. 3A or 4A.
Figure 23B:
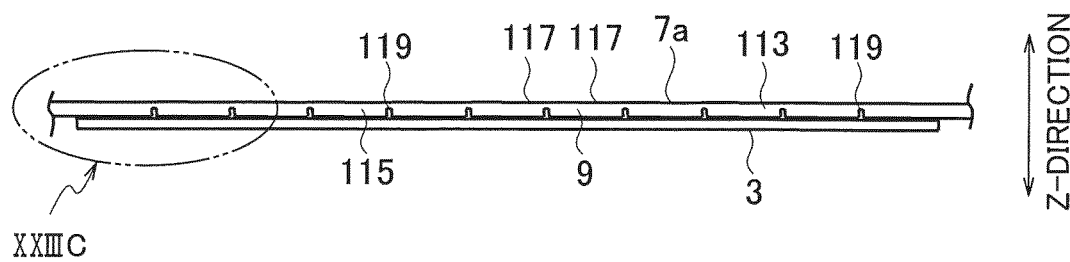
FIG. 23B is a cross sectional view taken along a XXIIIB-XXIIIB of FIG. 23A.
Figure 23C:
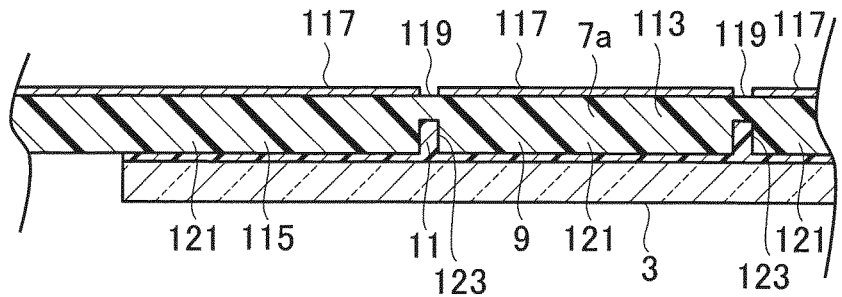
FIG. 23C is an enlarged view of a part XXIIIC of FIG. 23B.

In the above description, the mold 7 and the mask unit 13 are used for the transfer operation to the ultraviolet curable resin 11 of the substrate 3. Alternatively, as illustrated in FIGS. 23A to 23C, the transfer operation may be performed with use of a mold 7a integrated with the mask unit 13.

The mold 7a integrated with the mask unit 13 includes a main body part 113, a transfer pattern 115, and electromagnetic-wave shielding parts (for example, ultraviolet shielding parts) 117. The mold 7a integrated with the mask unit 13 has the similar structure as the above mentioned mold 7 except for the ultraviolet shielding parts 117.

That is, the main body part 113 is shaped to be a thin flat plate. The transfer pattern 115 includes a predetermined-shaped protrusion 121 formed on one surface of the main body part 113 in the thickness direction and portions 123 where the protrusion 121 on one surface of the main body part 113 in the thickness direction are absent (i.e. depressions 123).

The ultraviolet shielding parts 117 in the form of a thin film are formed on the other surface of the main body part 113 in the thickness direction (i.e. a surface opposite to the surface provided with the transfer pattern 115). Additionally, the ultraviolet blocking parts 117 are provided in the main body part 113 at portions where the protrusion 121 are seen in view from the thickness direction of the main body part 113, thereby shielding the electromagnetic waves of a predetermined wavelength (for example, ultraviolet rays) in the thickness direction of the main body part 113.

When viewed from the thickness direction of the main body part 113, portions other than the portions provided with the ultraviolet shielding parts 117 are electromagnetic-wave transmitting parts (ultraviolet transmitting parts) 119, and ultraviolet rays are transmitted through the ultraviolet transmitting parts 119 in the thickness direction of the main body part 113.

The ultraviolet shielding parts 117 may be provided when manufacturing the mold 7a. Alternatively, the transfer apparatus 41 may be provided with an electromagnetic-wave shielding part forming part (not illustrated), the ultraviolet shielding parts 117 may be provided prior to the pressing operation using the presser roller 71. For instance, the electromagnetic-wave shielding part forming part (for example, the ultraviolet shielding part forming part) could be formed by an ink jet printer.

According to the transfer apparatus 41 using the mold 7a integrated with the mask unit 13, the transfer pattern 115 formed with the predetermined protrusion 121 is provided on one surface of the main body part 113 of the mold 7a in the thickness direction, while the ultraviolet shielding parts 117 are provided at respective portions of the main body part 113 provided with the protrusion 121. Thus, it is possible to perform an accurate transfer of the transfer pattern without using a mask unit separately.

According to the mold 7a integrated with the mask unit 13, since the ultraviolet shielding parts 117 are provided in the form of thin films on the other surface of the main body part 113 in the thickness direction, it is possible to provide the ultraviolet shielding parts 117 by printing (e.g. ink jetting) after the transfer pattern 115 has been formed.

In the transfer method using the mold 7a integrated with the mask unit 13, the transfer operation is performed in a process including a substrate installation step, a mold pressing step and an irradiation step described below.

In the substrate installation step, it is performed to install a substrate 3 on the substrate installation unit 45. Here, the substrate 3 is provided, on its surface, with thin-film shaped uncured ultraviolet curable resin 11 which is formed into a thin film shape and which is to be cured by irradiation with ultraviolet rays.

In the mold pressing step, it is performed to press the mold 7a, which is formed with the predetermined transfer pattern 115 and the ultraviolet shielding part 117 having a similar shape as the predetermined transfer pattern 115, against the substrate 3 on which the uncured ultraviolet curable resin 11 is installed.

In the irradiation step, while pressing the mold 7a in the mold pressing step, it is performed to irradiate the uncured ultraviolet curable resin 11 on the substrate 3 with ultraviolet rays through the ultraviolet transmitting part 119 that is a part other than the ultraviolet shielding part 117 of the mold 7a.

The transfer method using the mold 7a integrated with the mask unit 13 may include a substrate/mold positioning step. In the substrate/mold positioning step, it is performed to position the substrate 3 with respect to the mold 7 a in a direction orthogonal to the thickness direction of the substrate 3 and the mold 7a before pressing the mold 7a against the substrate in the mold pressing step.

Although the thickness of the uncured ultraviolet curable resin 11 on the substrate 3 is constant in the above description, the thickness of the uncured ultraviolet curable resin 11 on the substrate 3 may be varied in the moving direction of the presser roller 71 in order to prevent the occurrence of voids in the uncured ultraviolet curable resin 11 existing between the mold 7 and the substrate 3 when pressing by the presser roller 71.

Figure 16A:
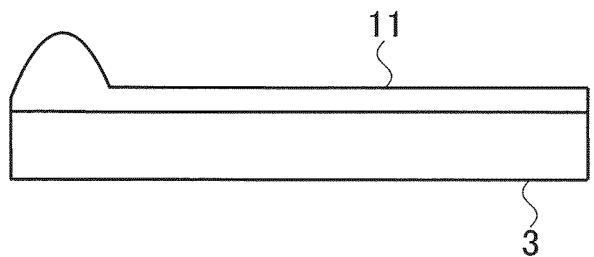
FIG. 16A is a view illustrating a form of ultraviolet curable resin provided on a substrate mounted on the transfer apparatus according to the embodiment.

Concretely, as illustrated in FIGS. 15A and 16A, the uncured ultraviolet curable resin 11 may be formed thicker at one end (rear end) of the substrate 3 than that of the other portions except the rear end (i.e. thin portions with a uniform thickness).

Figure 16B:
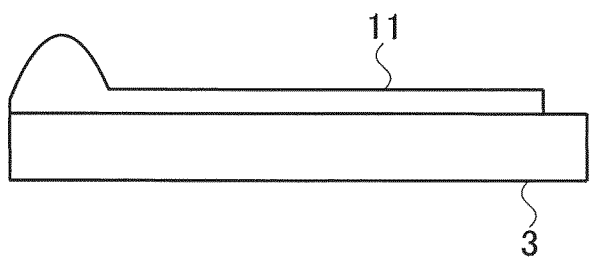
FIGS. 16B, 16C, and 16D are views illustrating modifications of the form.
Figure 16C:
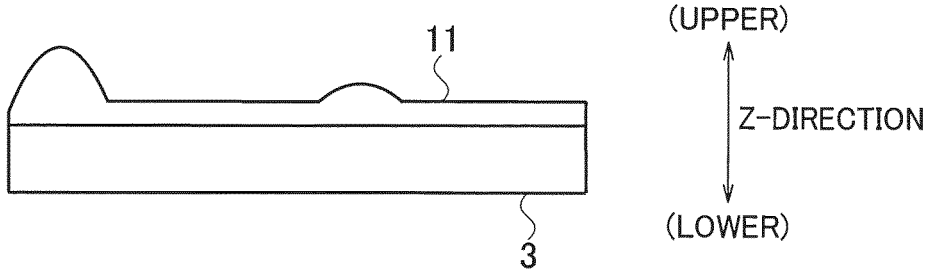
Figure 16D:
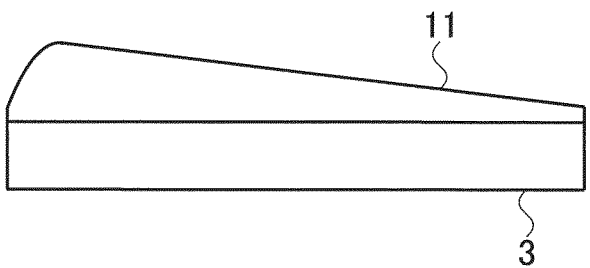

Providing that the uncured ultraviolet curable resin 11 is formed in this way, as illustrated in FIG. 16B, the substrate 3 may be provided, at the other end (front end), with a portion where the uncured ultraviolet curable resin 11 is not provided. Further, as illustrated in FIG. 16C, the uncured ultraviolet curable resin 11 may be thickened at an intermediate part in the moving direction of the presser roller 71. Alternatively, as illustrated in FIG. 16D, the thickness of the uncured ultraviolet curable resin 11 may be gradually reduced as approaching from the rear end toward the front end in the moving direction of the presser roller 71.

In a direction (width direction; Y axis direction) orthogonal to a direction connecting one end and the other end of the substrate 3 to each other, the uncured ultraviolet curable resin 11 on the substrate 3 may be thick at the central part and thin at both ends (For example, the thickness may be gradually reduced as approaching the both ends or it may be thicker only at a narrow area of the central part).

Providing that the uncured ultraviolet curable resin 11 on the substrate 3 is thickened at an end (one end) on the side of starting the pressing operation of the mold 7 and thinned at the other portions excluding this end, when the pressing of the mold 7 against the substrate 3 using the presser roller 71 is started, the uncured ultraviolet curable resin 11 is in an excessive state. Then, as the presser roller 71 moves to the other end of the substrate 3, the uncured ultraviolet curable resin 11 in the excessive state also moves to the other end of the substrate 3.

As a result, when expanding the portion of the mold 7 to be pressed against the substrate 3 of the mold 7 with the movement of the presser roller 71, the surplus state of the uncured ultraviolet curable resin 11 is gradually cancelled to allow the formation of voids in the ultraviolet curable resin 11 to be eliminated.

Further, by making the amount of the uncured ultraviolet curable resin 11 on the substrate 3 an appropriate value, it is possible to prevent the uncured ultraviolet curable resin 11 from protruding from between the substrate 3 and the mold 7 easily.

If the uncured ultraviolet curable resin 11 on the substrate 3 is thick at the central part of the substrate 3 in the width direction and thin at both ends of the substrate 3, then it is possible to eliminate the formation of voids in the ultraviolet curable resin 11 more securely.

Also providing that, without using the mold 3, a transfer pattern 9 is directly provided on a roller (not illustrated) corresponding to the presser roller 71, this transfer pattern 9 may be transferred to the uncured ultraviolet curable resin 11 on the substrate 3.

In this case, the transfer method includes a substrate installation step and a transfer step.

In the substrate installation step, it is performed to install a substrate 3 on the substrate installation unit 45. In the substrate 3, its surface is covered with a filmy uncured material (ultraviolet curable resin or thermoplastic resin) 11 that is cured under a predetermined environment.

In the transfer step, it is performed to press a columnar mold 7, whose side surface is provided with a predetermined transfer pattern 9, against the substrate 3 on which the material 11 is located, thereby transferring the predetermined transfer pattern 9 onto the material 11.

In the transfer step, the predetermined transfer pattern 9 is transferred to the material 11 by moving the mold 7 from one end of the substrate 3 to the other end (while establishing a rolling pair with the substrate). The uncured material 11 on the surface of the substrate 3 is made thick at one end of the substrate 3 and also made thin at the other portions excluding this one end.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transfer method, comprising:
    installing a substrate on a substrate installation unit, the substrate having a surface provided with a material that is cured by irradiation with electromagnetic waves of a predetermined wavelength;
    pressing a mold having a predetermined transfer pattern formed thereon against the substrate installed on the substrate installation unit;
    approaching a lower surface of a mask unit with an upper surface of the mold while pressing the mold against the substrate, thereby causing the lower surface of the mask unit to be slightly separated from the upper surface of the mold, the mask unit being formed with an electromagnetic-wave transmitting part of a predetermined shape through which the electromagnetic waves are transmitted;
    positioning the mask unit with respect to the mold pressing against the substrate while the lower surface of the mask unit is slightly separated from the upper surface of the mold;
    approaching the lower surface of the mask unit with the upper surface of the mold after positioning the mask unit with respect to the mold, thereby causing the lower surface of the mask unit to be brought into contact with the upper surface of the mold; and
    irradiating the material set on the substrate with the electromagnetic waves through the electromagnetic-wave transmitting part of the mask unit on condition of positioning the mask unit with respect to the mold when the lower surface of the mask unit has been brought into contact with the upper surface of the mold.

2. The transfer method of claim 1, wherein
    in a state where the positioning of the mask unit is completed, the electromagnetic-wave transmitting part of the mask unit is located inside a portion of the mold formed with the transfer pattern.

3. The transfer method of claim 1, further comprising positioning the substrate with respect to the mold before pressing the mold against the substrate.

4. The transfer method of claim 1, wherein
    the shape of the electromagnetic-wave transmitting part of the mask unit coincides with the shape of the transfer pattern of the mold, and
    positioning the mask unit with respect to the mold comprises aligning the position of the electromagnetic-wave transmitting part of the mask unit and the position of the transfer pattern of the mold with each other.

5. The transfer method of claim 1, wherein pressing the mold against the substrate, positioning the mask unit with respect to the mold, and irradiating the material set on the substrate with the electromagnetic waves are repeated a plurality of times while changing the position of the substrate with respect to the mold, whereby the transfer pattern is transferred to the material provided on the substrate.

* * * * *